United States Patent
Dellalyan et al.

(10) Patent No.: US 11,265,358 B1
(45) Date of Patent: Mar. 1, 2022

(54) AUDIO VIDEO OVER INTERNET PROTOCOL (AVOIP) COMMUNICATION SYSTEM

(71) Applicant: Cabin Management Solutions, LLC., Conroe, TX (US)

(72) Inventors: Edvard Dellalyan, Valley Glen, CA (US); Larry Uichanco, Westlake Village, CA (US); Troy Michaels, Spring, TX (US); Jeffrey M. McCormick, The Woodlands, TX (US); Henry Senanian, Woodland Hills, CA (US)

(73) Assignee: CABIN MANAGEMENT SOLUTIONS, LLC, Conroe, TX (US)

( * ) Notice: Subject to any disclaimer, the term of this patent is extended or adjusted under 35 U.S.C. 154(b) by 0 days.

(21) Appl. No.: 17/354,097

(22) Filed: Jun. 22, 2021

(51) Int. Cl.
*H04L 29/06* (2006.01)
*H04L 12/24* (2006.01)
*H04N 7/18* (2006.01)
*H04L 65/60* (2022.01)
*H04L 41/0806* (2022.01)
*H04L 65/80* (2022.01)

(52) U.S. Cl.
CPC ........ *H04L 65/607* (2013.01); *H04L 41/0806* (2013.01); *H04L 65/80* (2013.01); *H04N 7/181* (2013.01)

(58) Field of Classification Search
CPC ... H04L 65/607; H04L 65/80; H04L 41/0806; H04N 7/181
See application file for complete search history.

(56) References Cited

U.S. PATENT DOCUMENTS

| | | | |
|---|---|---|---|
| 10,623,289 B1* | 4/2020 | McCorkendale | ... H04L 43/0817 |
| 11,062,253 B1* | 7/2021 | Nanduri | ............... G06Q 10/083 |
| 2006/0181480 A1* | 8/2006 | Yee | ......................... G09G 5/006 345/3.1 |
| 2011/0224992 A1* | 9/2011 | Chaoui | ................... H04H 60/58 704/500 |
| 2017/0054770 A1* | 2/2017 | Wells | ................... H04L 65/1006 |
| 2017/0156076 A1* | 6/2017 | Eom | ...................... H04W 8/005 |
| 2021/0211500 A1* | 7/2021 | Ferguson | ................ H04L 12/10 |

FOREIGN PATENT DOCUMENTS

EP  3171581 A1 * 5/2017 ........... G06F 3/1289

* cited by examiner

*Primary Examiner* — Jonathan A Bui
(74) *Attorney, Agent, or Firm* — MH2 Technology Law Group LLP

(57) ABSTRACT

A method includes discovering a plurality of endpoint devices. The endpoint devices include an encoder and a decoder. The method also includes determining states of the endpoint devices. The method also includes determining statuses of the endpoint devices. The method also includes updating the control server to include the states of the endpoint devices based at least partially upon the statuses of the endpoint devices. The method also includes receiving a control change. The method also includes actuating the endpoint devices into new states based at least partially upon the control change.

28 Claims, 14 Drawing Sheets

AUDIO VIDEO OVER INTERNET PROTOCOL (AVOIP) COMMUNICATION SYSTEM

BACKGROUND

Conventional audio and video (AV) distribution for the commercial, residential, and enterprise markets include AV sources, AV displays, AV matrix switches, distribution amplifiers, extenders, various specific cabling, and a plethora of other equipment. These specialized, single-purpose use equipment are required just to connect and distribute various AV sources, such as cable boxes, media players, Blu-ray players, and computers, to monitors and televisions in multifarious rooms, such as conference rooms, board rooms, lobbies, bars, restaurants, home theaters, family rooms, etc.

Conversely, audio and video over internet protocol (AVoIP) is an emerging technology where every AV source utilizes an encoder while all display devices employ a decoder. The encoder performs the compression and packetizing of real-time AV while the decoder decompresses and converts packet data to real-time AV. In some instances, uncompressed AV packets may be distributed if the employed network can accommodate the required bandwidth. There are numerous coder/decoder (Codec) standards used in AVoIP applications where visually lossless compression and low latency transmission are of prime consideration.

SUMMARY

An audio video over internet protocol (AVoIP) communication system for communicating within an aircraft is disclosed. The AVoIP communication system includes one or more sources. The one or more sources include one or more audio sources and one or more video sources. The AVoIP communication system also includes one or more speakers configured to output audio from the one or more audio sources. The AVoIP communication system also includes one or more displays configured to output video from the one or more video sources. The AVoIP communication system also includes a plurality of endpoint devices. The endpoint devices include: one or more encoders configured to be in communication with the one or more sources and a network switch; and one or more decoders configured to be in communication with the one or more displays and the network switch. The AVoIP communication system also includes a control server configured to be in communication with the one or more speakers and the endpoint devices via the network switch. The control server is configured to perform operations. The operations include transmitting discovery signals to the endpoint devices. The operations also include receiving discovery response signals from the endpoint devices in response to the discovery signals. The discovery response signals indicate that the endpoint devices are online, ready for operation, or both. The operations also include transmitting first state signals to the endpoint devices. The operations also include receiving first state response signals from the endpoint devices in response to the first state signals. The first state response signals identify states of the endpoint devices, and the states of the endpoint devices include a first state of a first of the endpoint devices. The operations also include comparing the states of the endpoint devices with stored states. The stored states are stored in an internal device table in the control server. The operations also include determining that the first state of the first endpoint device differs from a first stored state in the internal device table based upon the comparison. The operations also include transmitting a configuring signal to the first endpoint device that actuates the first endpoint device into the first stored state. The operations also include receiving a configuring response signal from the first endpoint device that indicates that the first endpoint devices has actuated into the first stored state. The operations also include transmitting status signals to the endpoint devices. The operations also include receiving status response signals from the endpoint devices in response to the status signals. The status response signals indicate statuses of the endpoint devices. The operations also include updating the internal device table to include the states of the endpoint devices, including the first stored state of the first endpoint device, based at least partially upon the statuses of the endpoint devices. The operations also include receiving one or more control changes. The operations also include validating the one or more control changes. The operations also include transmitting second state signals to the endpoint devices after validating the one or more control changes. The operations also include receiving second state response signals from the endpoint devices that echo the second state signals, indicating that the endpoint devices have actuated into new states. The one or more speakers output the audio, the one or more displays output the video, or both at least partially in response to the endpoint devices actuating into the new states. The operations also include updating the internal device table to include the new states for the endpoint devices.

A communication system for communicating within a vehicle is also disclosed. The communication system includes a plurality of endpoint devices. The endpoint devices include: one or more encoders configured to be in communication with one or more sources and a network switch; and one or more decoders configured to be in communication with one or more displays and the network switch. The communication system also includes a control server configured to be in communication with the endpoint devices via the network switch. The control server is configured to perform operations. The operations include discovering the endpoint devices. The operations also include determining states of the endpoint devices. The operations also include determining statuses of the endpoint devices. The operations also include updating the control server to include the states of the endpoint devices based at least partially upon the statuses of the endpoint devices. The operations also include receiving one or more control changes. The operations also include actuating the endpoint devices into new states in response to the one or more control changes. The operations also include receiving echo signals from the endpoint devices that indicate that the endpoint devices have actuated into the new states.

A method is also disclosed. The method includes discovering a plurality of endpoint devices. The endpoint devices include an encoder and a decoder. The method also includes determining states of the endpoint devices. The method also includes determining statuses of the endpoint devices. The method also includes updating the control server to include the states of the endpoint devices based at least partially upon the statuses of the endpoint devices. The method also includes receiving a control change. The method also includes actuating the endpoint devices into new states based at least partially upon the control change.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
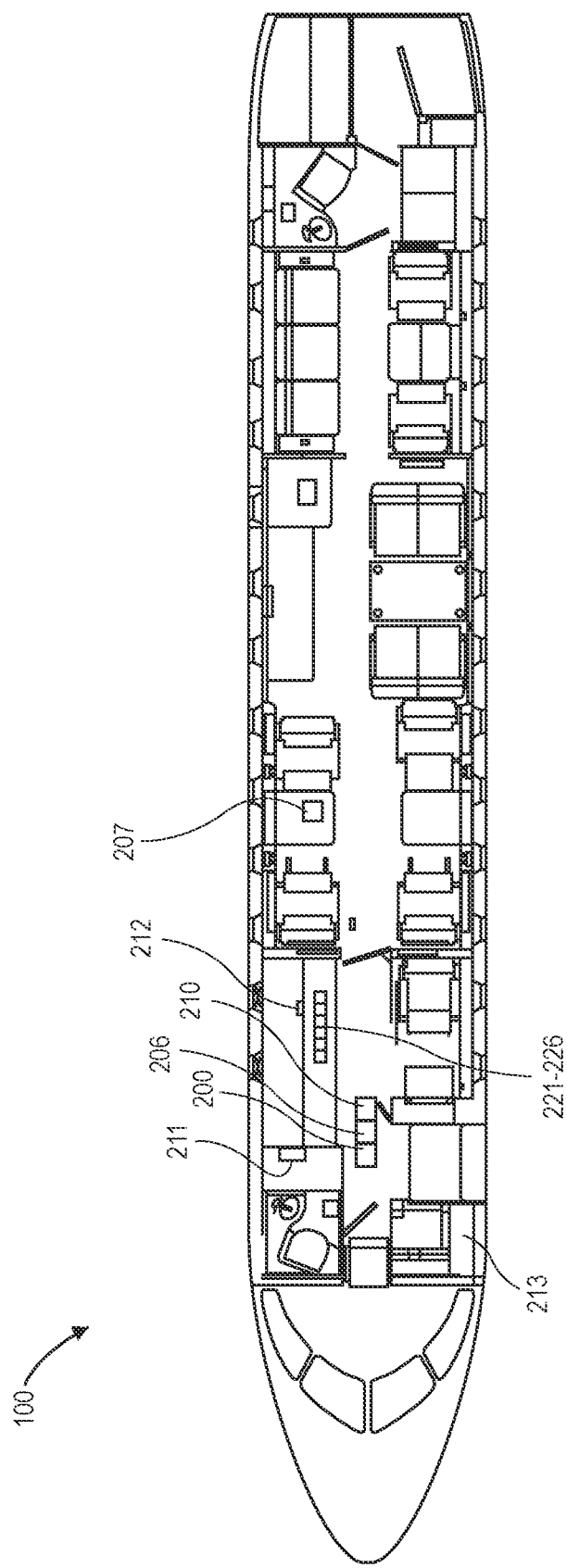
FIG. 1 illustrates a schematic plan view of a portion of a vehicle, according to an embodiment.

FIG. 1 illustrates a plan view of a portion of a vehicle 100, according to an embodiment. In the example shown in FIG. 1, the vehicle 100 is an aircraft (e.g., an airplane). However, as will be appreciated, the systems and methods described herein may also or instead be used in other vehicles such as cars, buses, trains, boats, helicopters, spaceships, etc. The systems and methods may also or instead be used in non-vehicles, such as buildings (e.g., homes, offices, schools, stadiums, etc.).

The vehicle 100 may include a communication system 200 (also referred to as an IP-logic ecosystem) 200. The communication system 200 may include (or be in communication with) one or more sources 206 and one or more displays 207. The sources 206 may be or include audio sources and/or video sources. For example, the sources 206 may be or include Blu-ray players, media players, cable boxes, satellite dishes, gaming consoles, PA systems, audio receivers, CD players, audio amplifiers, or a combination thereof. The displays 207 may be or include televisions, projectors, videowall monitor arrays, or a combination thereof. Although several illustrative sources 206 and displays 207 are listed above, it will be appreciated that these lists are merely illustrative and not exhaustive. The communication system 200 may be in communication with the sources 206 and/or the displays 207 wirelessly or via one or more wires. The communication system 200 may be configured to control the sources 206 and/or the displays 207, as described below.

The vehicle 100 may also include a cabin manager unit (CMU) 210. In one embodiment, the CMU 210 may be part of the communication system 200. In another embodiment, the CMU 210 may be in wired or wireless communication with the communication system 200. The CMU 210 may segregate and manage broadcast domains of the communication system 200. The CMU 210 may also determine which frequencies the communication system 200 may use at a given time based at least partially upon the strongest frequencies (e.g., with the greatest bandwidth) and/or least-encumbered frequencies (e.g., the most reliable frequencies). Thus, the CMU 210 may switch between frequencies (e.g., frequency hop) to spread the spectrum of signals to overcome potential interference and latency.

The CMU 210 may be in communication with one or more devices (three are shown: 211-213). In one embodiment, the devices 211-213 may be or include the sources 206, the displays 207, or both. For example, the device 211 may be a television (i.e., a display 207). In another embodiment, the devices 211-213 may be different from the sources 206 and the displays 207. For example, the device 211 may be part of a water system on the vehicle 100.

The devices 211-213 may be in communication with the CMU 210 wirelessly or via one or more wires. For example, the devices 211-213 may be in communication with the CMU 210 via one or more wires that are installed before the CMU 210 is installed (i.e., existing wires). The CMU 210 may be configured to control the devices 211-213. More particularly, the CMU 210 may be configured to cause the devices 211-213 to actuate into and/or between one or more states (e.g., on or off). For example, the CMU 210 may be configured to cause the devices 211-213 to actuate into a first (e.g., default) state when the vehicle 100, the communication system 200, and/or the CMU 210 is turned on.

Several illustrative devices 211-213 are identified in FIG. 1 and described below; however, it will be appreciated that this list is merely illustrative and not exhaustive. The devices 211-213 may be classified into one or more priority levels by an authorized user, and the priority levels may be pre-programmed (e.g., stored) into the CMU 210. For example, the devices 211-213 may be classified into first (e.g., high) priority level devices, second (e.g., intermediate) priority level devices, and third (e.g., low) priority level devices.

The first (e.g., high) priority level devices 211 may rely upon substantially real-time communication. Thus, communication involving or controlling the first (e.g., high) priority level devices 211 may take priority over communication involving or controlling other devices 212, 213. In an example, the first (e.g., high) priority level device 211 is part of a water system, which may perform functions such as turning a water system on/off, pressurizing the lines, heating and line purging, etc. More particularly, the first (e.g., high) priority level device 211 may be a wet sensor that is part of the water system. In an example, in response to a measurement from the wet sensor 211 (e.g., indicating a problem with the water system), substantially real-time communication with the CMU 210 may be used to turn the water system on/off. Although not shown, other first (e.g., high) priority level devices may be or include cabin calls to the cockpit annunciator panel, call chime, or other any device that requires an immediate response from a user input.

The communication with the second (e.g., intermediate) priority level devices 212 may have a lesser priority than the first (e.g., high) priority level devices 211; however, the second (intermediate) level priority devices 212 may still take priority over communication with some other devices 213. The second (e.g., intermediate) priority level devices 212 may be or include devices that transmit and/or receive high-volume signals. The second (e.g., intermediate) priority level devices 212 may also or instead be or include devices that transmit and/or receive signals related to diagnostics, logs, statistical analysis, etc. In an example, the second (e.g., intermediate) priority level device 212 may be an up-wash and down-wash light. Although not shown, other second (e.g., intermediate) priority level devices may be or include entry lights, main cabin lights, aisle lights, lavatory lights, table/reading lights, flight attendant calls, window shades, entertainment and information displays, thermostats, and the like.

The communication with the third (e.g., low) priority level devices 213 may have a lesser priority than the first (e.g., high) priority level devices 211 and the second (e.g., intermediate) level devices 212. The third (e.g., low) priority level devices 213 may be or include devices that transmit and/or receive signals that involve no user input and/or do not control systems functions. In an example, the third (e.g., low) priority level device 213 may be a chiller. As will be appreciated, a delay of a second or two does not directly or substantially affect the user (e.g., passenger) or the chiller.

The priority level of the devices 211-213 may be changed in the CMU 210 at any time by the authorized user. In addition, the priority level of the devices 211-213 may differ from vehicle to vehicle. For example, although the vehicle (e.g., aircraft) 100 described above may have the chiller classified as a third (e.g., low) priority level device, another aircraft may classify the chiller as a second (e.g., intermediate) priority level device.

The communication system 200 and/or the CMU 210 may also include (or be in communication with) one or more panels (six are shown: 221-226). The panels 221-226 may be or include buttons, knobs, switches, touch-screens, or the like that are configured to receive user input (e.g., commands) to control one or more of the devices 211-213. The panels 221-226 may be in communication with the CMU 210 and/or the devices 211-213 wirelessly or via one or more wires. In one embodiment, the panels 221-226 may be configured to control one or more of the devices 211-213 directly (e.g., without transmitting signals to the CMU 210). In another embodiment, the panels 221-226 may be configured to control one or more of the devices 211-213 indirectly. More particularly, the panels 221-226 may transmit wireless signals to the CMU 210, and the CMU 210 may then transmit signals to the one or more devices 211-213 to control the one or more devices 211-213. The signals from the CMU 210 to the devices 211-213 may be wireless or via one or more (e.g., existing) wires.

Several panels 221-226 are identified in FIG. 1; however, it will be appreciated that this list is merely illustrative and not exhaustive. In an example, a first panel 221 may be or include a galley control panel (also referred to as a master switch) that is configured to control one or more of the devices (e.g., the wet sensor 211 and the up-wash and down-wash lights 212). A second panel 222 may be or include a forward lavatory panel that is configured to control one or more of the devices (e.g., a lavatory light and a toilet in the forward lavatory). A third panel 223 may be or include an aft lavatory panel that is configured to control one or more of the devices (a lavatory light and a toilet in the aft lavatory). Additional panels 224-226 may be or include passenger control units (e.g., proximate to the seats) that are configured to control one or more of the devices (e.g., the up-wash and down-wash lights 212 and the table/reading lights 213). Although not shown, in one embodiment, each of the seats may have a corresponding panel (e.g., passenger control unit).

Figure 2:
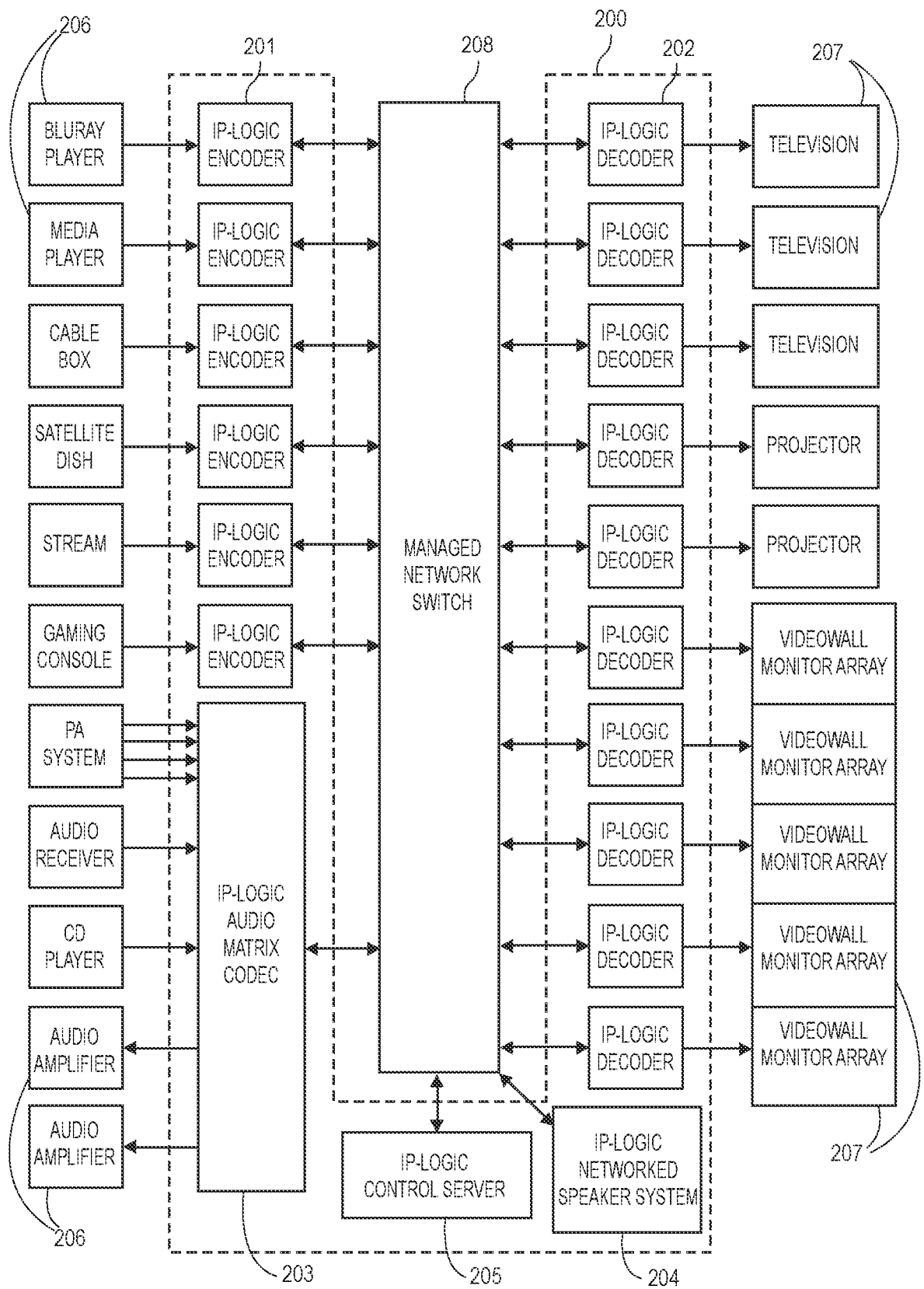
FIG. 2 illustrates a schematic view of a communication system that may be used in the vehicle, according to an embodiment.

FIG. 2 illustrates a schematic view of the communication system 200, according to an embodiment. The communication system 200 may include one or more encoders 201, one or more decoders 202, one or more audio matrix codecs 203, one or more networked speaker systems 204, and one or more control servers 205. The encoders 201 and/or the audio matrix codecs 203 may be in wired or wireless communication with the sources 206. The decoders 202 may be in wired or wireless communication with the displays 207. The encoders 201, decoders 202, audio matrix codecs 203, networked speaker systems 204, control servers 205 or a combination thereof may be in wired or wireless communication with one or more managed network switches 208.

The control server 205 may be the central control server used as the main user interface. The control server 205 may have a built-in web graphical user interface (GUI) that can be accessed with any web browser. The control server 205 may configure and maintain the operational modes of one or more endpoint devices (e.g., the encoders 201, the decoders 202, the audio matrix codecs 203, the networked speaker systems 204, or a combination thereof). The control server 205 may also serve as the command conduit to allow third-party control systems (e.g., smart phones) to configure the endpoint devices (e.g., 201, 202, 203, 204).

The distribution, extension, and switching of AV may be performed by the network switches 208 using simplified RJ-45 or optical network cabling. In large deployments, AVoIP may replace single purpose conventional AV matrix switches with network switches. The configuration of conventional AV gear may be fixed and sometimes requires replacement of the hardware if the needs of the customer exceed the number of physical ports of the matrix switches or distribution amplifiers. AVoIP offers scalability by taking advantage of the expandable capabilities of network switches. The number of encoders 201 and decoders 202 can be expanded to meet the growing needs of the enterprise.

AVoIP offers flexibility by employing a data network structure to distribute AV. By adding an AVoIP endpoint device, any AV can be routed to a room with a network connection. There may be no disruption with the existing facility cabling. In a conventional point-to-point infrastructure, routing of specialized cabling and conduits is required for each room, and there are limitations to the lengths of the cable runs. AVoIP benefits from the use of data network cabling that may already be routed in the facility, while virtually eliminating the distance limitations found in traditional AV cabling such as HDMI and audio RCA.

The communication system 200 offers the same flexibility and scalability of most AVoIP product offerings. The following description describes features that differentiate this communication system 200 from conventional AVoIP systems. The communication system 200 may simultaneously employ a multitude of AVoIP standards including SDVoE, AES67, ST2110, RAVENA, and/or Dante AES within the same device. The communication system 200 may include multiple network interfaces, and the supported AVoIP protocols may be directed to broadcast on specific network ports for deployment flexibility and/or network cost considerations.

The communication system 200 (e.g., the control server 205) can communicate with the CMU 210 to control (e.g., reconfigure) one or more (e.g., all) of the speakers in the speaker system 204. The communication system 200 (e.g., the control server 205) can also or instead communicate with the CMU 210 to control (e.g., adjust) one or more (e.g., all) of the displays 207. This may include adjusting the brightness, color settings, etc. for optimum conditions.

In n example, if a user (passenger) wants to watch a movie in the vehicle 100, the user may press on a touchpad, which may transmit a signal to the CMU 210. The touchpad may be on the user's phone or tablet, or the touchpad may be part of the vehicle 100. The CMU 210 may then, in turn, transmit a signal to the communication system 200 (e.g., the control server 205). In response to this signal, one or more of the speakers and/or the subwoofer in the speaker system 204 may be adjusted. In addition, in response to this signal, the monitors in the displays 207 may be adjusted to the optimum brightness and color settings for the content being played.

Technologies and Methodologies

Configurable AVoIP Network Ports

Figure 3:
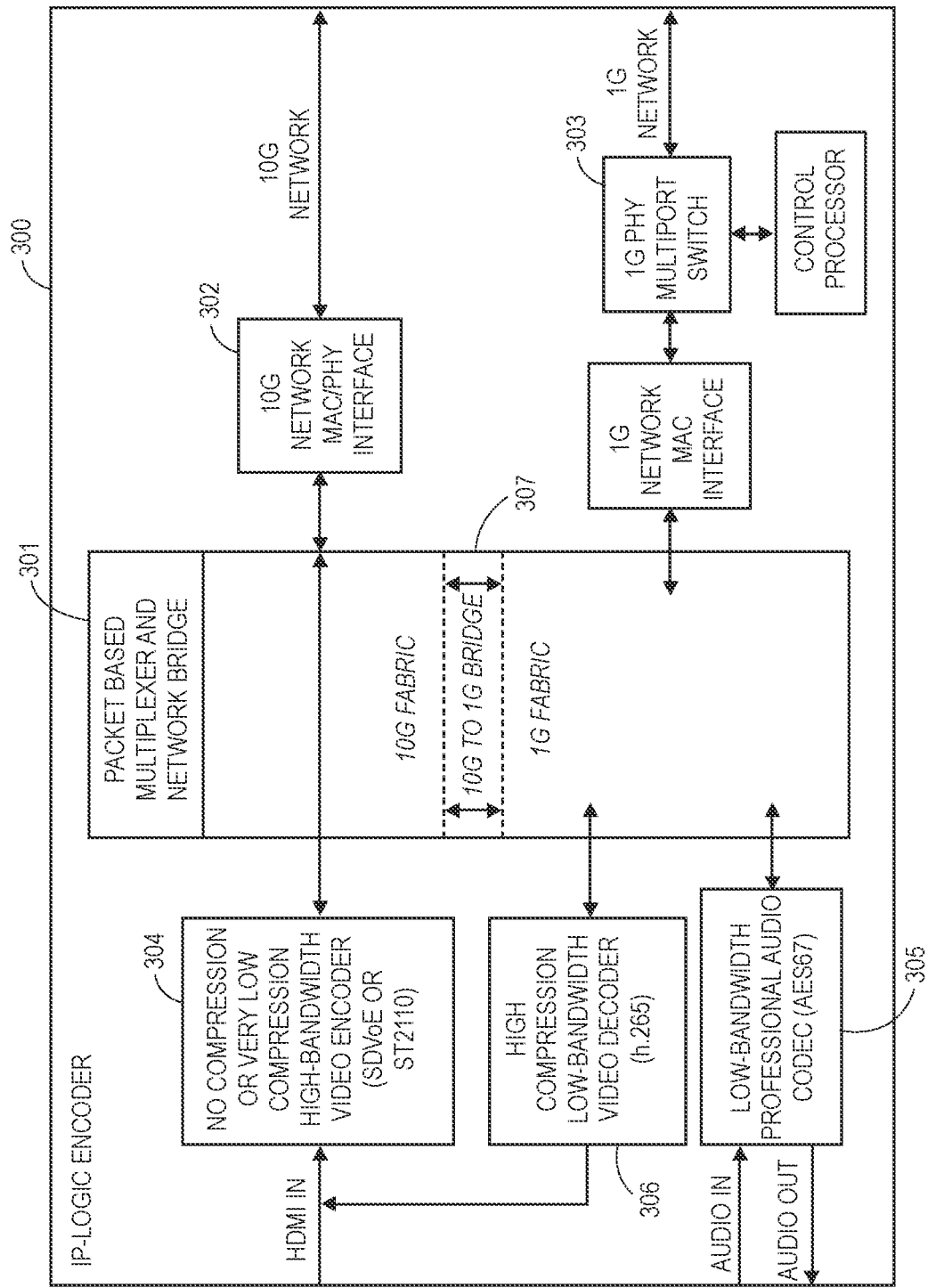
FIG. 3 illustrates a schematic view of an encoder that may be part of the communication system, according to an embodiment.
Figure 4:
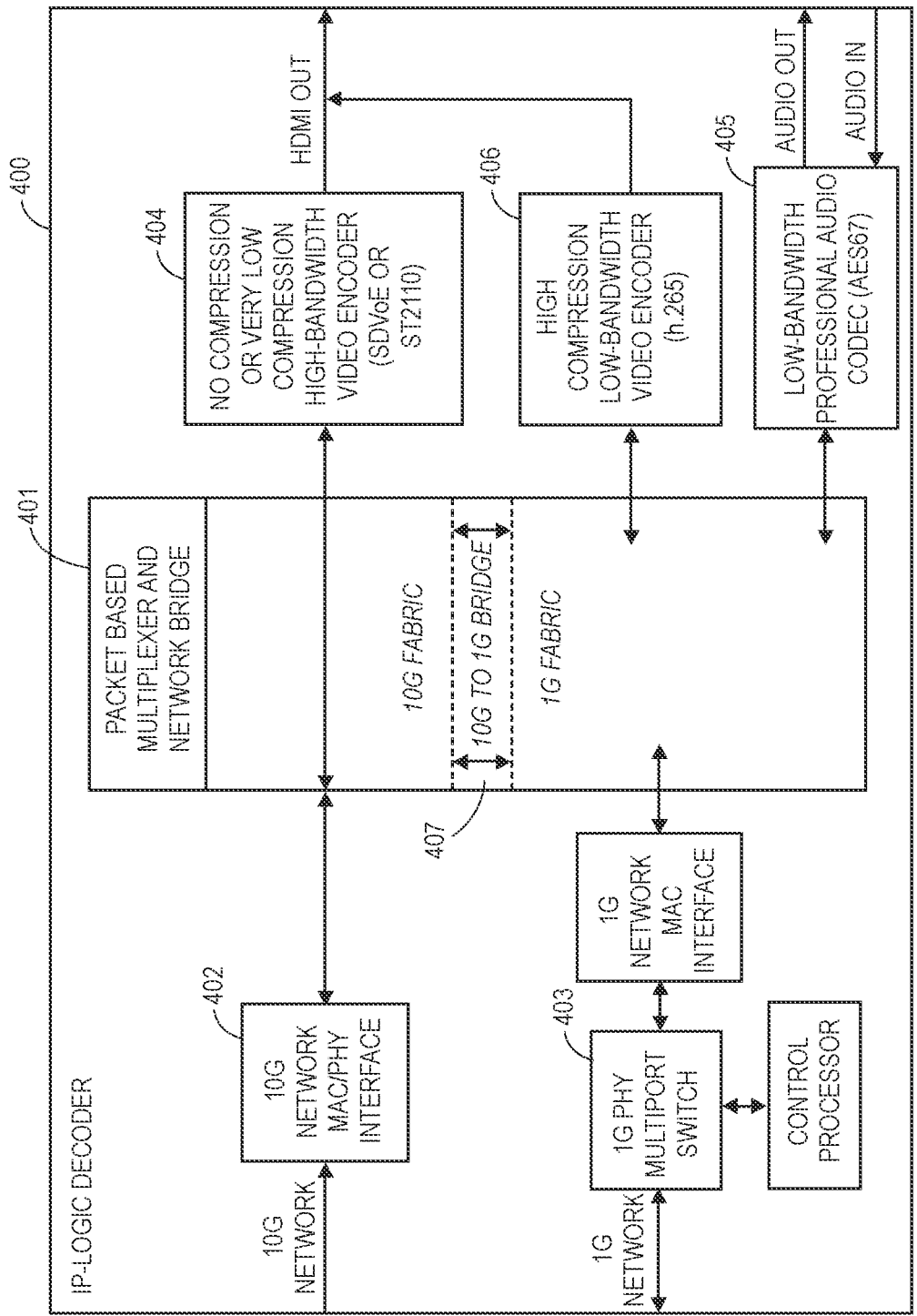
FIG. 4 illustrates a schematic view of a decoder that may be part of the communication system, according to an embodiment.

FIG. 3 illustrates a schematic view of an encoder 300 that may be used in the communication system 200, and FIG. 4 illustrates a schematic view of a decoder 400 that may be used in the communication system 200, according to an embodiment. The encoder 300 may be the same as or different from the encoder 201 in FIG. 2. The decoder 400 may be the same as or different from the decoder 202 in FIG. 2.

The endpoint devices (e.g., encoder 300 and/or decoder 400) may utilize multiple AVoIP network ports through the use of configurable packet-based multiplexing and network bridging to provide flexibility where performance, security, and cost are important considerations in an AVoIP deployment. The encoder 300 and/or decoder 400 may utilize multiple network ports, for example, a 10 Gigabit (10G) network interface 302, 402, and a 1 Gigabit (1G) network interface 303, 403. The 1G interface may be configured to participate in the 10G network through a configurable multiplexer and network bridge 301, 401. The 1G interface can also be isolated from the 10G interface for added flexibility.

To improve video quality and minimize latency, the encoder 300 and/or decoder 400 may incorporate SDVoE, ST2110 encoding/decoding 304, 404, or any high-performance compression protocols to create a high-bandwidth AV data packet for transmission over the 10G network interface. This high-bandwidth data packet may provide visually lossless compression with minimal latency.

A professional audio codec 305, 405 (e.g., AES67) and high-compression video codec 306, 406 (e.g., h.265) may yield low-bandwidth AV data packets that can easily fit over the 1G network. While h.265 can compress ultra-high definition (UHD) video to fit the lower bandwidth 1G interface, the resulting video may suffer from extended latency and compression artifacts that may be acceptable in non-discerning installations such as bars and restaurants. Depending on the installation, consumer level 1G network switches and category cabling can be used to distribute these low-bandwidth AV data packets and isolate them from the 10G data packets by disabling the network bridge 307, 407. For larger deployments and quality-centric installations with sufficient 10G network ports, the number of network equipment can be reduced by configuring the configurable multiplexer 301, 401 of the encoder 300 and/or decoder 400 to integrate both low-bandwidth AV data packets and high-bandwidth AV data packets over the same 10G interface by enabling the network bridge 307, 407. The configurable multiplexer 301, 401 may be set to bridge the 1G and 10G network interfaces 307, 407. When bridging is enabled, the 10G network port may have sufficient bandwidth headroom to allow both low-bandwidth AV data packets and high-bandwidth AV data packets to share the 10G network path.

The configurable AVoIP network ports of the encoder 300 and/or decoder 400 may allow flexible network deployments by taking into consideration equipment cost and implementation of existing network equipment. For instance, most facilities have existing 1G network cabling and network switches in place. The communication system 200 can take advantage of this by routing low-bandwidth video and audio packets through the 1G interface of the encoder 300.

On the other hand, an AVoIP deployment may utilize complete isolation and added security of the AVoIP network with the rest of the facility LAN used for computer networking, email, Internet access, etc. In so doing, the communication system 200 can divert some or all AVoIP network traffic (e.g., high-bandwidth video packets, low-bandwidth video packets, and low-bandwidth audio packets) to the 10G network. The communication system 200 may employ sufficient compression of the AVoIP network data packets to ensure that the 10G bandwidth limit is not exceeded.

With the communication system's configurable AVoIP network ports, the network installation and network infrastructure costs are reduced. The installer can choose to use a single 10G category cabling to route the AVoIP traffic (e.g., high-bandwidth AV, low-bandwidth AV, and AES67). That means only a single network cable may be used for each encoder and decoder installation, resulting in a reduction in the number of ports for the 10G network switches.

High-Compression AV Streaming/Receiving for Mobile Devices

The communication system 200 may integrate high-compression AV streaming and receiving to address the needs of mobile devices (e.g., smart phones and tablets) in an AVoIP application. The decoder 400 may have one or more integrated h.265 encoders 406 to allow any connected AVoIP networked media to be distributed to mobile devices. The encoder 300 may have one or more integrated h.265 decoders 306 to allow media from mobile devices to be distributed to the AVoIP network. Mobile devices can run software-based high-compression encoding and decoding by applying h.265 compression on an MPEG transport stream. The h.265 compression is the current high-compression standard for UHD video, but the communication system 200 can employ any high-compression standard.

Mobile devices are becoming ubiquitous in how people view and listen to media. The communication system 200 with integrated real-time transcoding (e.g., h.265) 306, 406 may allow seamless integration between mobile devices and UHD AVoIP networking. The high-compression h.265 network media can be transported to either of the communication system's 10G base T or 1G base T Ethernet connection.

Integrated SOM with WiFi Connectivity for High-Compression AV Streaming

Figure 5:
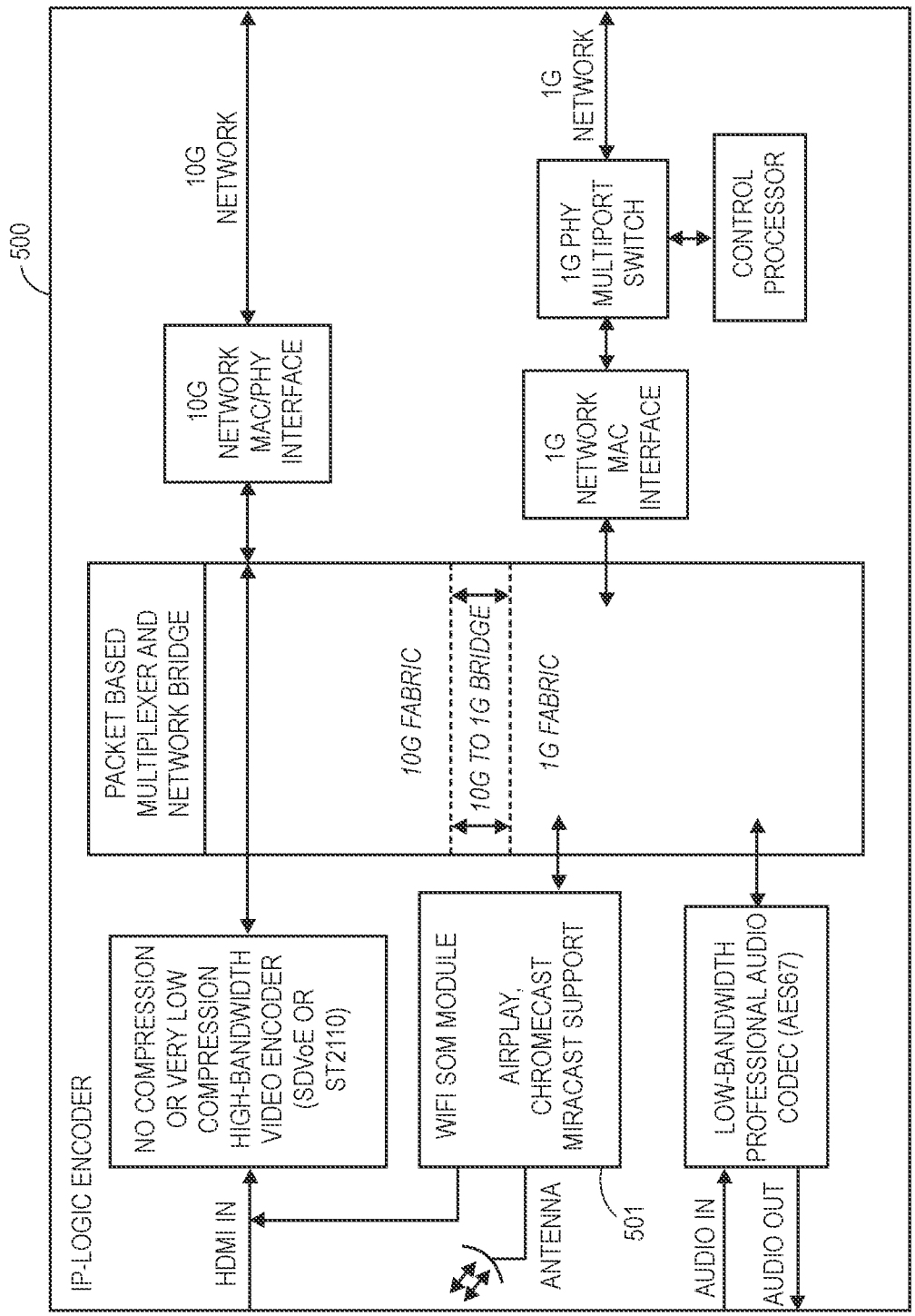
FIG. 5 illustrates a schematic view of another encoder that may be part of the communication system, according to an embodiment.

FIG. 5 illustrates a schematic view of another encoder 500, according to an embodiment. The encoder 500 may be the same as or different from the encoder 201 in FIG. 2 and/or the encoder 300 in FIG. 3.

The communication system 200 may integrate one or more system on modules (SOM) with WiFi connectivity to seamlessly integrate video streaming devices to participate in the AVoIP network. The encoder 500 may include a SOM 501 with WiFi (e.g., wireless network protocol) connectivity to eliminate the need for additional purpose-built WiFi endpoints in the AVoIP network. The use of WiFi endpoints in an AVoIP network may allow participation with purpose-built wireless video streaming devices such as, but not limited to, smartphones, tablets, laptops, security cameras, doorbell cameras, voice assistants (Alexa®, Google Assistant®, Siri®), videoconference, presentation systems, etc. Mobile devices may support screen mirroring functionality through streaming media services such as, but not limited to, Apple Airplay®, Google Chromecast®, and Miracast®. These devices with their associated services may be able to stream their media directly to the communication system's integrated SOMs 501 with WiFi connectivity, and display the media streams to any connected displays in the AVoIP network.

The wireless video streaming devices may utilize high compression protocols such as, but not limited to, h.264, h.265, motion JPEG, etc. The SOM modules 501 can decode these protocols for real-time display of video and audio on the display endpoints. Matrix connections of these WiFi sources may be implemented on the mixed matrixing GUI (discussed below) with automatic transcoding to enable mixed connections with differing AVoIP protocols (e.g., ST2110, SDVoE, AES67, etc.).

Networked Self-Powered Speaker System

Figure 6:
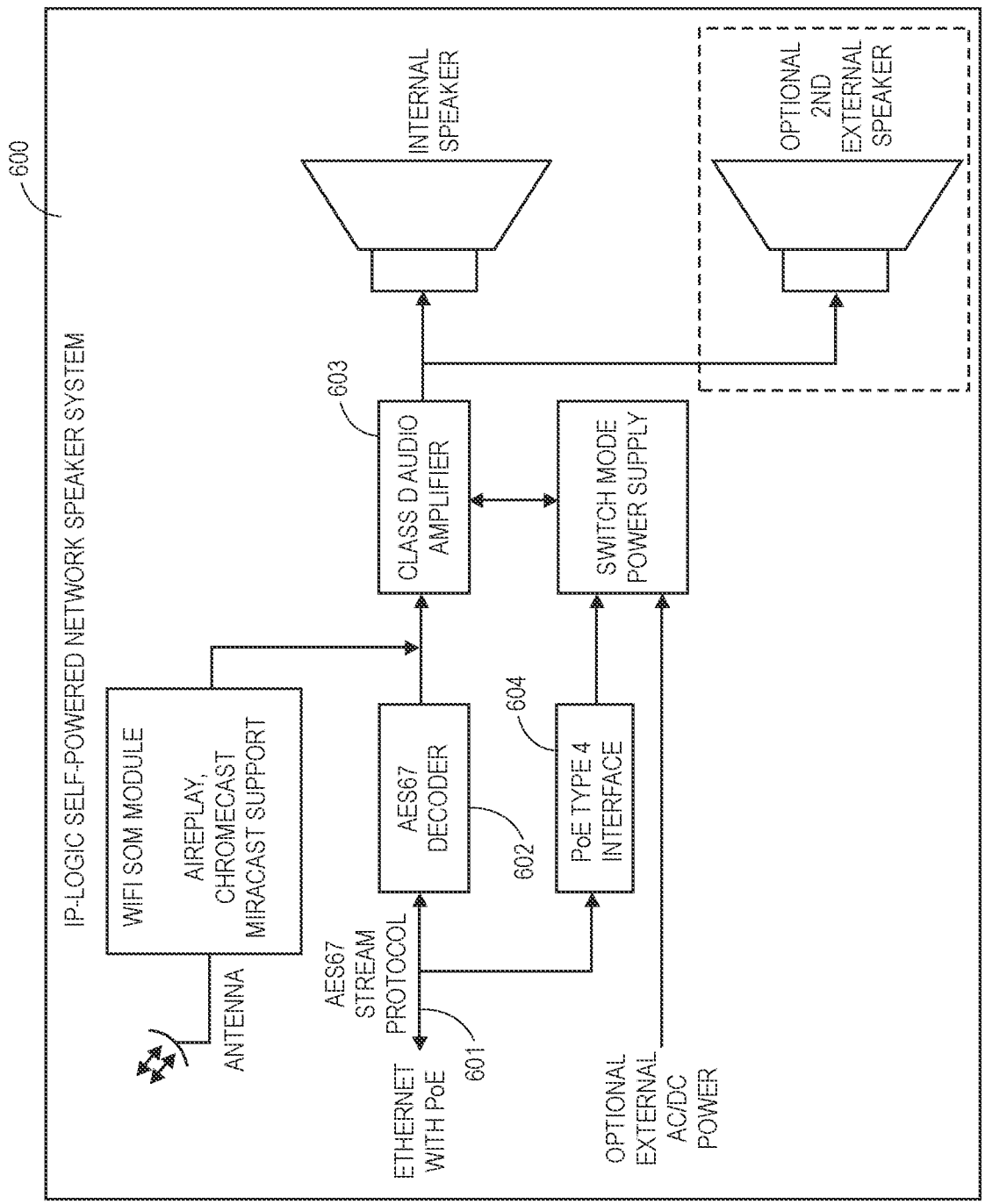
FIG. 6 illustrates a schematic view of a self-powered network speaker system that may be part of (or in communication with) the communication system, according to an embodiment.

FIG. 6 illustrates a schematic view of a self-powered network speaker system 600, according to an embodiment. The speaker system 600 may be the same as or different from the speaker system 204 in FIG. 2. The communication system 200 may incorporate the self-powered networked speaker system 600 in an AVoIP application for ease of installation in enterprise, large venues, and vehicle applications.

A big contributor to the cost of installing a speaker system is the routing of audio cables, installation of power for ceiling installations, routing conduits to meet regulatory compliance, required sound treatments to optimize room acoustics, and installation of ancillary equipment such as multi-zone amplifiers, audio distribution amplifiers, microphones, audio sources, etc. The self-powered speaker (NSS) 600 may mitigate a large portion of the cost by implementing category network cabling 601, built-in AVoIP decoders 602, built-in audio amplification 603, and power-over-ethernet (PoE) 604. An optional SOM Module with WiFi connectivity may allow seamless audio streaming from a mobile device to play directly to a particular speaker location.

Category network cabling may be used in commercial and residential installations. Some installations are already pre-wired with category network cabling, which can be used in the speaker system 600. The cost to route network cabling is much less than conventional routing of heavy gauge speaker wires routed along the walls and ceilings. With the NSS 600, audio may be transmitted using the AVoIP infrastructure and network cabling 601, contrary to conventional speaker systems that require additional audio amplifiers and heavy gauge speaker wires.

High-wattage speakers require high wattage amplification and heavy gauge speaker wires. With the NSS 600, the high-efficient class D audio amplifier 603 may be integrated within the speaker enclosure. The power supply may also be integrated and use power-over-ethernet (PoE) to deliver in upwards of 70 watts (e.g., the current maximum Type 4 PoE rating) 604 through the category network cable. No AC power may be required at the speaker installation site; however, an AC power input may be included in case PoE sourcing equipment is not available at the installation. Some NSS enclosures may come with a single speaker, so a control is provided to select the channel to be heard: left channel, right channel, or monoaural.

With its built-in AVoIP decoder and self-powered circuitry, the speaker system 600 may serve as another AVoIP endpoint that can be matrix-connected to other AVoIP sources in the communication system 200. The NSS 600 can also operate with $3^{rd}$ party AES67 systems. The NSS 600 may eliminate ancillary equipment such as multi-zone amplifiers, distribution amplifiers, and specialized audio cable routing.

Autonomous EDID Management

Figure 7:
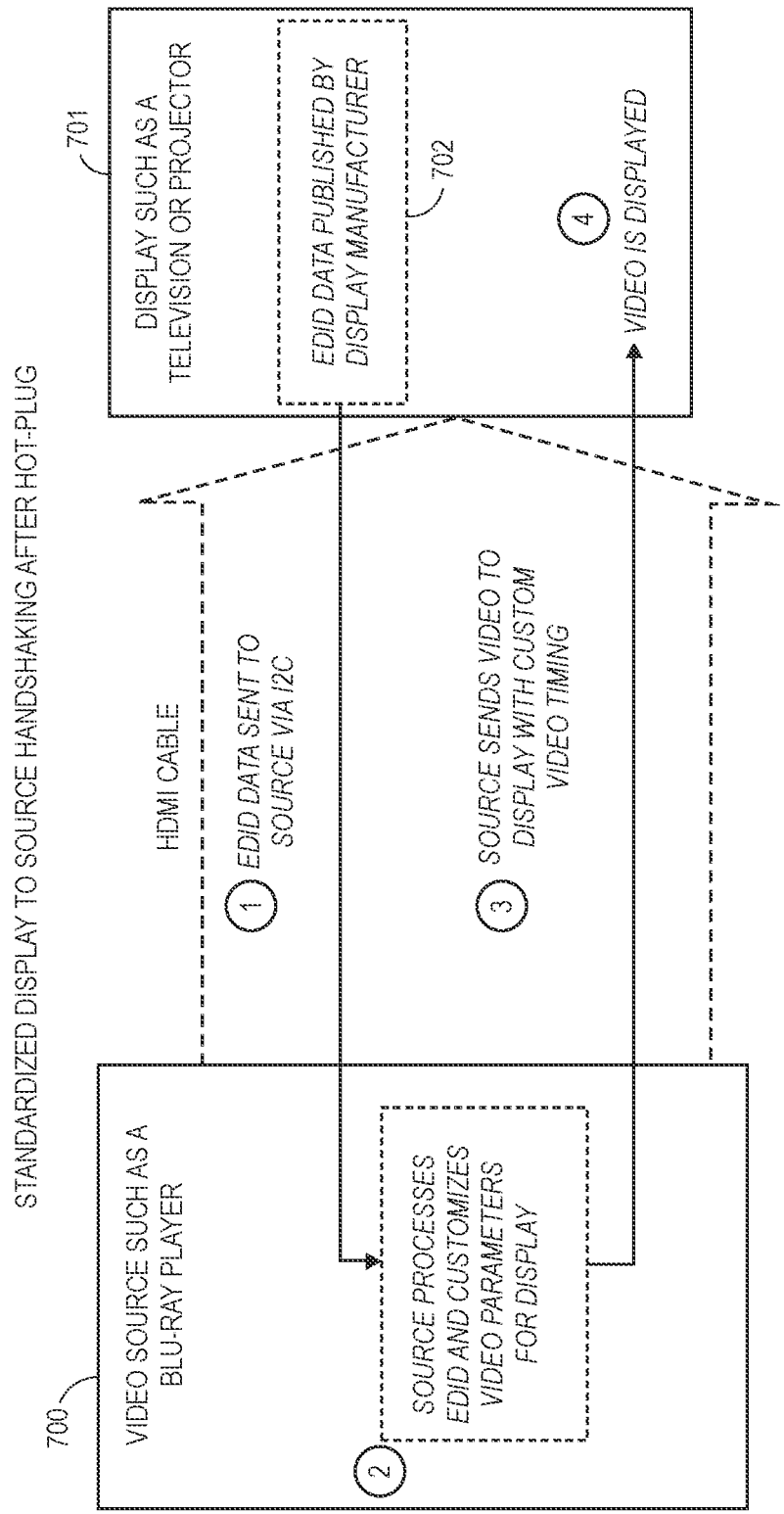
FIG. 7 illustrates a schematic view of a display that may be part of (or in communication with) the communication system, according to an embodiment.

FIG. 7 illustrates a schematic view of a display to source handshaking after a hot-plug event, according to an embodiment. The source 700 may the same as or different from the source 206, and the display 701 may be the same as or different from the display 207. Autonomous extended display information data (EDID) management may allow an automatic compatibility mode, a native mode, and/or user intervention to control video endpoints between sources 700 and displays 701. High-definition multimedia interface (HDMI) is a standardized AV interface for transmitting uncompressed video and compressed or uncompressed digital audio from a source device 700, such as a cable set-top box, a Blu-ray player, a media player, or a computer, to an HDMI-compliant display device 701, such as a television, a computer monitor, or a digital projector. HDMI is a digital replacement to legacy analog video standards, and is the AV connection commonly found in consumer/prosumer AV appliances. The HDMI standard uses the EDID 702 metadata format, which may be published by the display's manufacturer and permanently stored on the display device's memory. This metadata may then be sent to the source device so that the source device can generate audio and video formats that are optimum for the display device. The EDID format may be defined and published by the video electronics standards association (VESA).

The EDID protocol may be or include a 256-byte data format with display information such as manufacturer, serial number, product type, display horizontal and vertical timing support, display size, luminance data, pixel mapping data, and audio format support. The display manufacturer publishes this EDID information for its specific display model. After a "Hot-Plug" event, where a source is connected to a display endpoint, the source device may read the EDID data of the display 701 so the source can customize the video format for that display 701. This serves as a plug-and-play structure to cause the video timing, resolution, and color information generated by the source to be compatible with the connected display 701.

Figure 8:
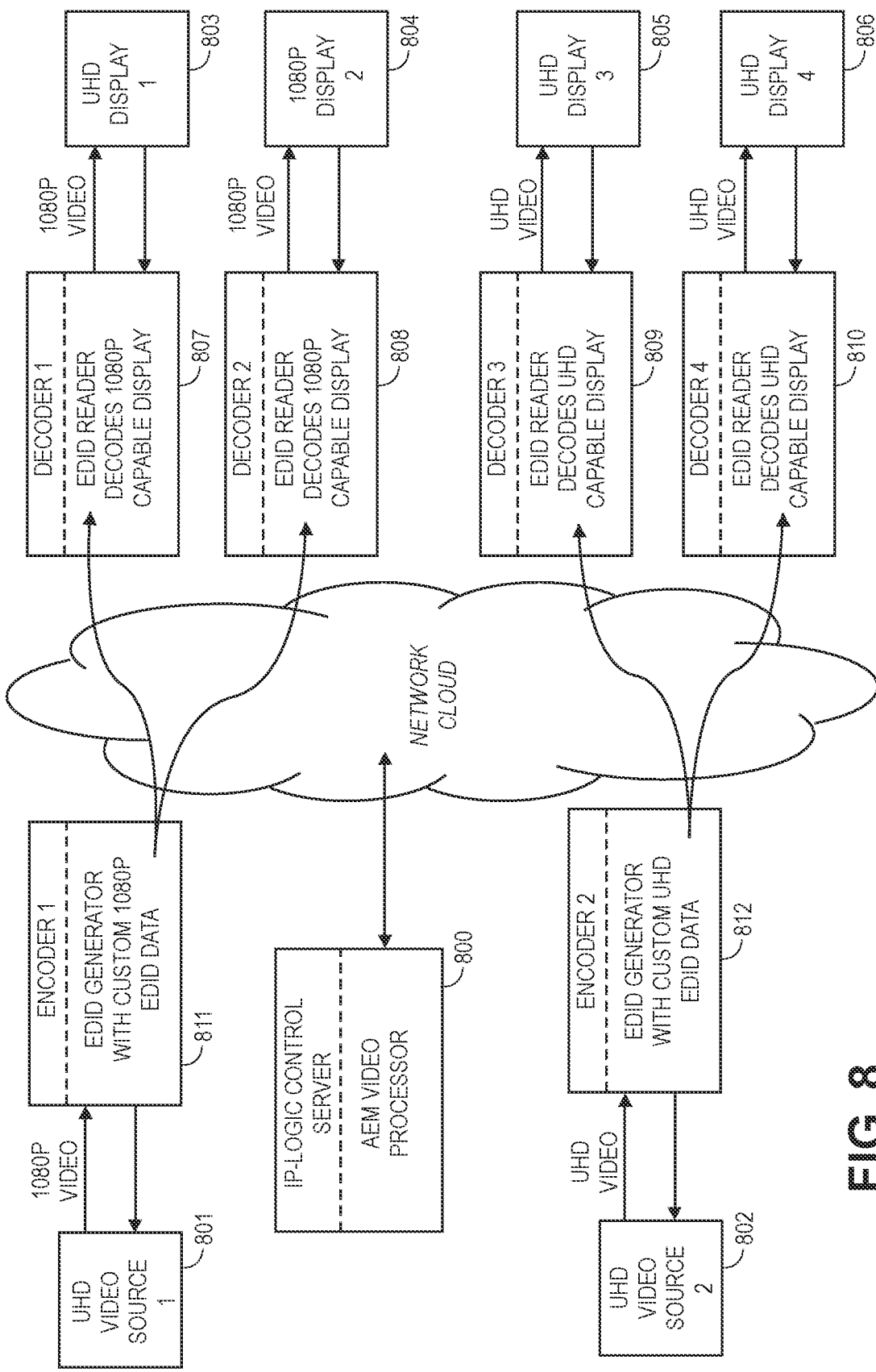
FIG. 8 illustrates a schematic view of an autonomous extended display information data (EDID) management system that may be part of (or in communication with) the communication system, according to an embodiment. The EDID management system is shown in a video compatibility mode.
Figure 9:
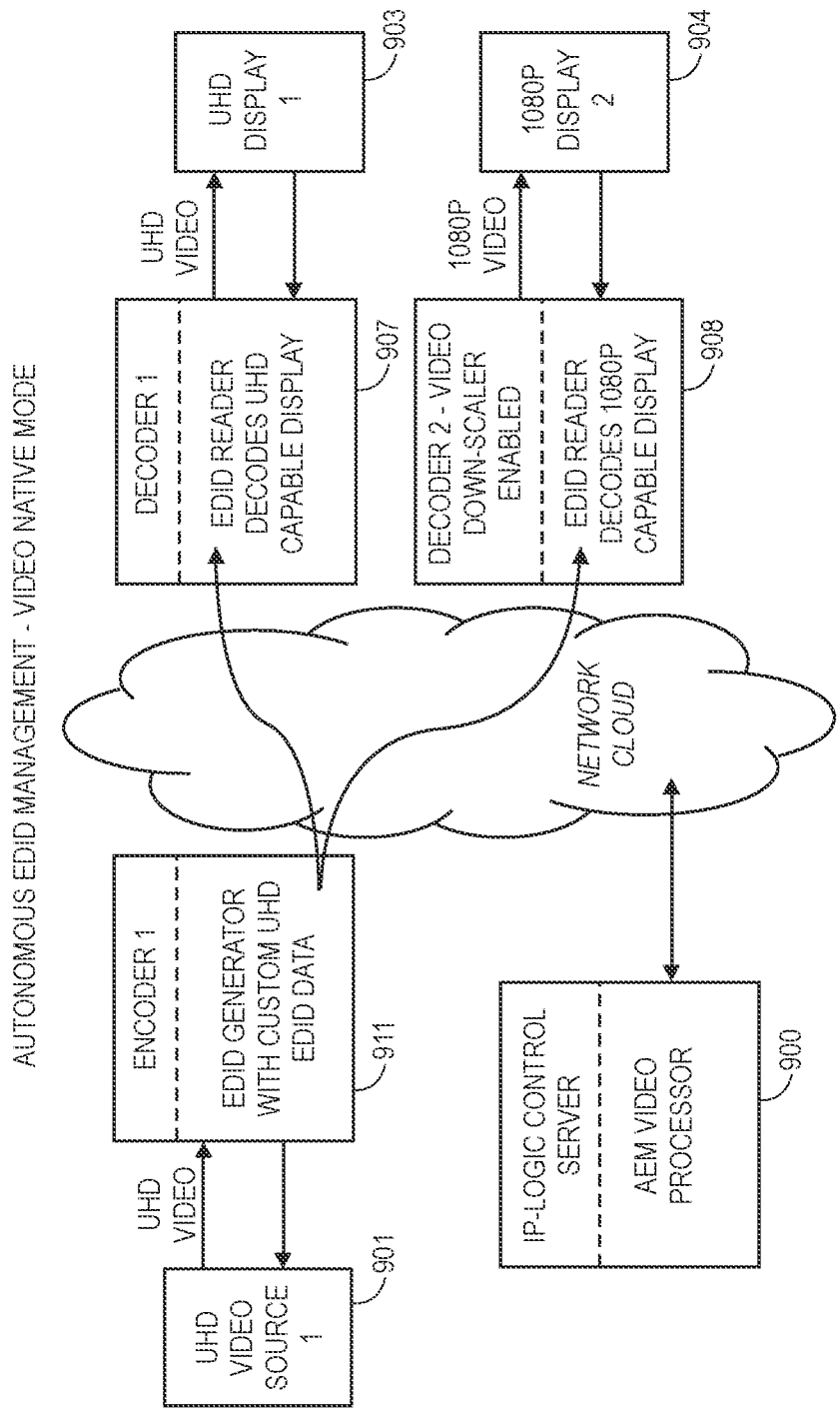
FIG. 9 illustrates a schematic view of the autonomous EDID management system in a video native mode, according to an embodiment.

FIG. 8 illustrates a schematic view of the autonomous EDID management system in a video compatibility mode, according to an embodiment. FIG. 9 illustrates a schematic view of the autonomous EDID management system in a video native mode, according to an embodiment. The communication system 200 may include autonomous EDID management (AEM) to automatically configure the encoder device 201 and decoder devices 202 throughout the communication system 200. The AEM video processor 800, 900 may facilitate installations with mixed video resolution sources 801, 802, 901 and displays 803, 804, 805, 806, 903, 904. The AEM can be set up for maximum compatibility so that the display devices 803, 804, 805, 806, 903, 904, regardless of their native resolutions, may be able to view the video sources 801, 802, 901. The AEM can also be arranged to ensure that UHD display devices 803, 805, 806, 903 retain their native 4K or higher resolution while lower definition displays 804, 904 receive scaled down video to retain compatibility.

Figure 10:
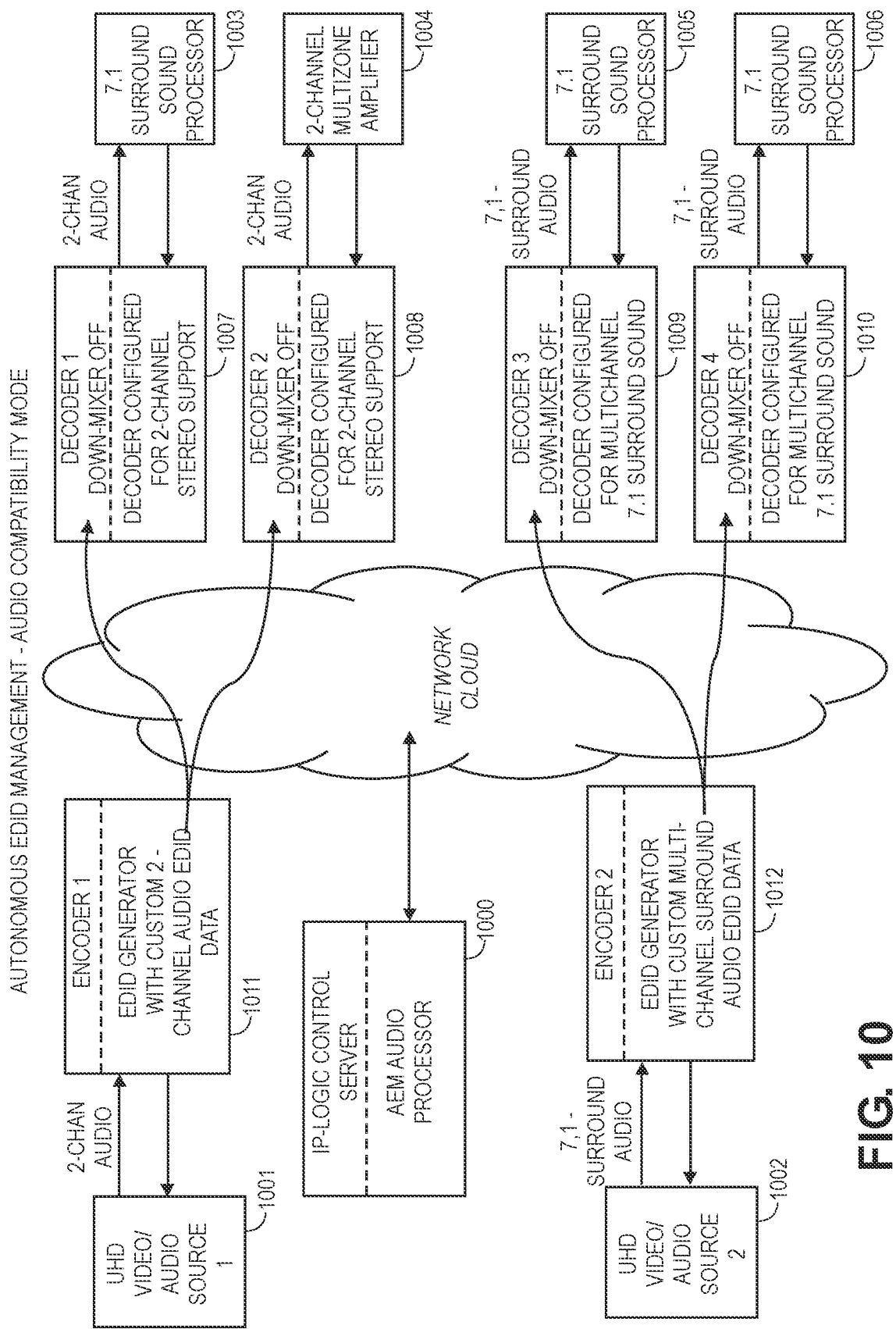
FIG. 10 illustrates a schematic view of the autonomous EDID management system in an audio compatibility mode, according to an embodiment.
Figure 11:
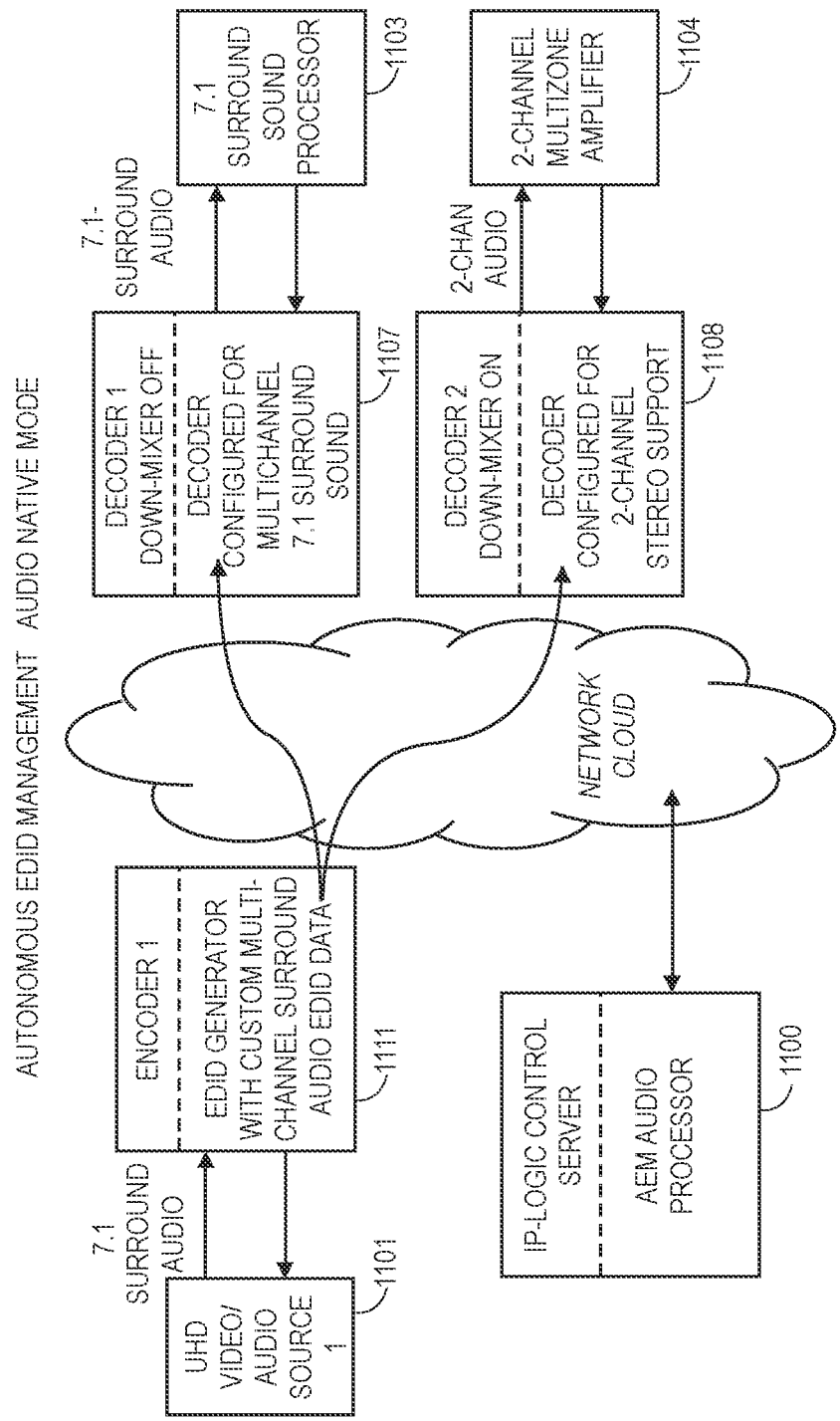
FIG. 11 illustrates a schematic view of the autonomous EDID management system in an audio native mode, according to an embodiment.

FIG. 10 illustrates a schematic view of the autonomous EDID management system in an audio compatibility mode, according to an embodiment. FIG. 11 illustrates a schematic view of the autonomous EDID management system in an audio native mode, according to an embodiment. The AEM audio processor 1000, 1100 may also facilitate installations with audio sources 1001, 1002, 1101 and mixed capability audio amplifiers 1003, 1004, 1005, 1006, 1103, 1104. The AEM can be set up for maximum compatibility so that the audio amplifiers 1003, 1004, 1005, 1006, 1103, 1104, regardless of their mixed channel capabilities, may be able to hear the audio sources 1001, 1002, 1101. The AEM can also be arranged to ensure that multi-channel surround sound processors (e.g., 7.1 or greater) 1003, 1005, 1006, 1103 receive native multi-channel surround sound while lower capable amplifiers 1004, 1104 receive downmixed 2-channel audio to retain compatibility.

AEM Video Compatibility Mode

Referring again to FIG. 8, the AEM processor 800 may query the EDID readers from the decoders 807-810 in the communication system 200 to determine the native resolution capabilities of the displays 803-806. The AEM processor may consider the interconnects between the encoders 811, 812 and decoders 807-810, and then determine the proper video format, resolution, and color space for each encoder 811, 812. The AEM processor may then send the preconfigured EDID data to the encoders 811, 812. The AEM compatibility mode may configure the encoders 811, 812 to output video for the least capable connected display to ensure that the displays 803-806 in the communication system 200 show video from its connected source 801, 802.

In the AEM video compatibility mode example, the encoder 811 may be connected to the decoders 807, 808. As the display 804 is only a 1080p capable display in this example, the AEM processor may compute a custom EDID for the encoder 811 to configure the video source 801 to only output 1080p resolution video. This scenario may generate compatibility by providing lower resolution 1080p video to the connected displays 803, 804.

On the other hand, the AEM processor may determine that the encoder 812 is connected to the decoders 809, 810. As the connected displays 805, 806 are UHD capable displays, the AEM processor may compute a custom EDID for the encoder 812 to configure the video source 802 to output high-resolution UHD video. This scenario may yield compatibility while providing the best quality UHD video for the connected UHD capable displays 805, 806.

AEM Video Native Mode

Referring again to FIG. 9, the AEM processor 900 may query the EDID readers from the decoders 907, 908 in the communication system 200 to determine the native resolutions of the connected displays 903, 904. The AEM processor may consider the interconnects between encoder(s) 911 and the decoders 907, 908, and then determine the proper video format, resolution, and color space for each encoder 911. The AEM processor may also configure the built-in video scalers for the connected decoders 907, 908. The AEM processor may then send the preconfigured EDID data to the encoder 911 and enable or disable the decoders' built-in scaler 907, 908. The AEM compatibility mode may configure the encoder 911 to output video for the most capable connected display(s) 903, 904 so that high-resolution UHD display(s) 903 receive video in their native high-resolution formats. The AEM processor may also enable the video down-scaler for the decoders 908 connected to lower-resolution displays 904 to ensure that these monitors can display video in their native lower resolution formats.

In the AEM video native mode example, the encoder 911 may be connected to the decoders 907, 908. The AEM processor may determine that the most capable display 903 has the highest native resolution of UHD. The AEM processor may then compute a custom EDID for the encoder 911 to configure the video source 901 to output the highest quality video resolution of UHD. Since the display 904 is only a 1080p capable display in this example, the AEM processor may enable the video down-scaler of the decoder 908 to scale the incoming UHD video down to only 1080p. This scenario may cause the most capable UHD display 903 to receive and view the video in its native high-resolution UHD format. This scenario may also provide compatibility with lower resolution 1080p displays by enabling the appropriate video down-scalers featured in the decoders 907, 908.

AEM Video Manual Mode

The AEM processor may query the displays 803-806, 903, 904 in the communication system 200 to determine their native display capabilities. The AEM processor may then display the monitor capabilities to the user through the GUI. The user can manually select the configuration of the encoder(s) 811, 812, 911 by selecting any available options determined by the AEM processor. The user can also manually enable or disable the video down-scaler featured on the decoders 807-810, 907, 908 to ensure the connected monitors are capable of displaying the incoming video. Once the user selections are complete, the AEM processor may perform the system configuration of the encoder(s) 811, 812, 911 and decoders 807-810, 907, 908 based on the options selected by the user. AEM video manual mode may allow the user to manually configure all or part of the system devices (e.g., encoders/decoders) from available system options determined by the AEM processor.

AEM Audio Compatibility Mode

Referring again to FIG. 10, the AEM processor 1000 may query the EDID readers from the decoders 1007-1010 in the communication system 200 to determine the native audio channel capabilities of the audio endpoints 1003-1006. The AEM processor may consider the interconnects between encoders 1011, 1012 and decoders 1007-1010 and then determine the proper audio format for each encoder 1011, 1012. The AEM processor may then send the preconfigured EDID data to the encoders 1011, 1012. The AEM compatibility mode may configure the encoders 1011, 1012 to output audio for the least capable connected audio endpoint 1003-1006 to ensure that every audio in the communication system 200 may be heard on its connected amplifiers.

In the AEM audio compatibility mode example, the encoder 1011 may be connected to the decoders 1007, 1008. As the audio endpoint 1004 is a 2-channel amplifier in this example, the AEM processor may compute a custom EDID for the encoder 1011 to configure the audio source 1001 to only output 2-channel stereo audio. This scenario may provide compatibility by providing 2-channel audio to the connected endpoints 1003, 1004.

On the other hand, the AEM processor may determine that the encoder 1012 is connected to the decoders 1009, 1010. As the connected endpoints 1005, 1006 are multi-channel surround sound capable in this example, the AEM processor may compute a custom EDID for the encoder 1012 to configure the audio source 1002 to output multi-channel surround sound. This scenario may provide compatibility while providing high quality audio surround sound for the connected surround sound processors 1005, 1006.

AEM Audio Native Mode

Referring again to FIG. 11, the AEM processor 1100 may query the EDID readers from the decoders 1107, 1108 in the communication system 200 to determine the native audio channel capabilities of the audio endpoints 1103, 1104. The AEM processor may consider the interconnects between the encoder(s) 1111 and decoders 1107, 1108, and then determine the proper audio format for each encoder 1111. The AEM processor may also configure the built-in audio down-mixers for the decoders 1107, 1108. A down-mixer refers to an audio signal processing technique to convert any multi-channel audio surround format down to a lower channel count surround or 2-channel stereo format. The AEM processor may send the preconfigured EDID data to the encoder 1111 and enable or disable the connected decoders' built-in down-mixer. The AEM compatibility mode may configure the encoder 1111 to output audio for the most capable connected endpoint(s) 1103, 1104 so that high-quality multi-channel surround sound is retained. The AEM processor may enable the audio down-mixer for decoders 1107, 1108 connected to 2-channel only endpoints 1103, 1104 to ensure that audio is heard on these amplifiers in their native 2-channel audio formats.

In the AEM audio native mode example, the encoder 1111 may be connected to the decoders 1107, 1108. The AEM processor may determine that the most capable endpoint 1103 supports the highest quality multi-channel surround sound audio. The AEM processor may then compute a custom EDID for the encoder 1111 to configure the audio source 1101 to output the highest quality multi-channel audio format. As the endpoint 1104 is only a 2-channel amplifier in this example, the AEM processor may enable the audio down-mixer of the decoder 1108 to convert the incoming multi-channel surround audio down to only 2-channel stereo. This scenario may cause the most capable surround sound processors to receive audio in its native multi-channel surround sound format. This scenario may also provide compatibility with lower capable 2-channel amplifiers by enabling the appropriate audio down-mixers featured in some decoders 1107, 1108.

AEM Audio Manual Mode

The AEM processor may query the audio endpoints 1003-1006, 1103, 1104 in the communication system 200 to determine their native audio capabilities. The AEM processor may display the audio capabilities to the user through the GUI. The user can manually select the configuration of the encoder(s) 1011, 1012, 1111 by selecting any available options determined by the AEM processor. The user can also manually enable or disable the audio down-mixer feature on certain decoders 1007-1010, 1107, 1108 to ensure the connected audio endpoint 1003-1006, 1103, 1104 is capable of outputting audio in 2-channel stereo format. Once the user selections are complete, the AEM processor may perform the system configuration of the encoder(s) 1011, 1012, 1111 and decoders 1007-1010, 1107, 1108 based on the options selected by the user. AEM audio manual mode may allow the user to manually configure all or part of the system devices (e.g., encoders/decoders) from available system options determined by the AEM processor.

HDMI Digital Audio Extraction/Embedding with AES67 Protocol

Figure 12:
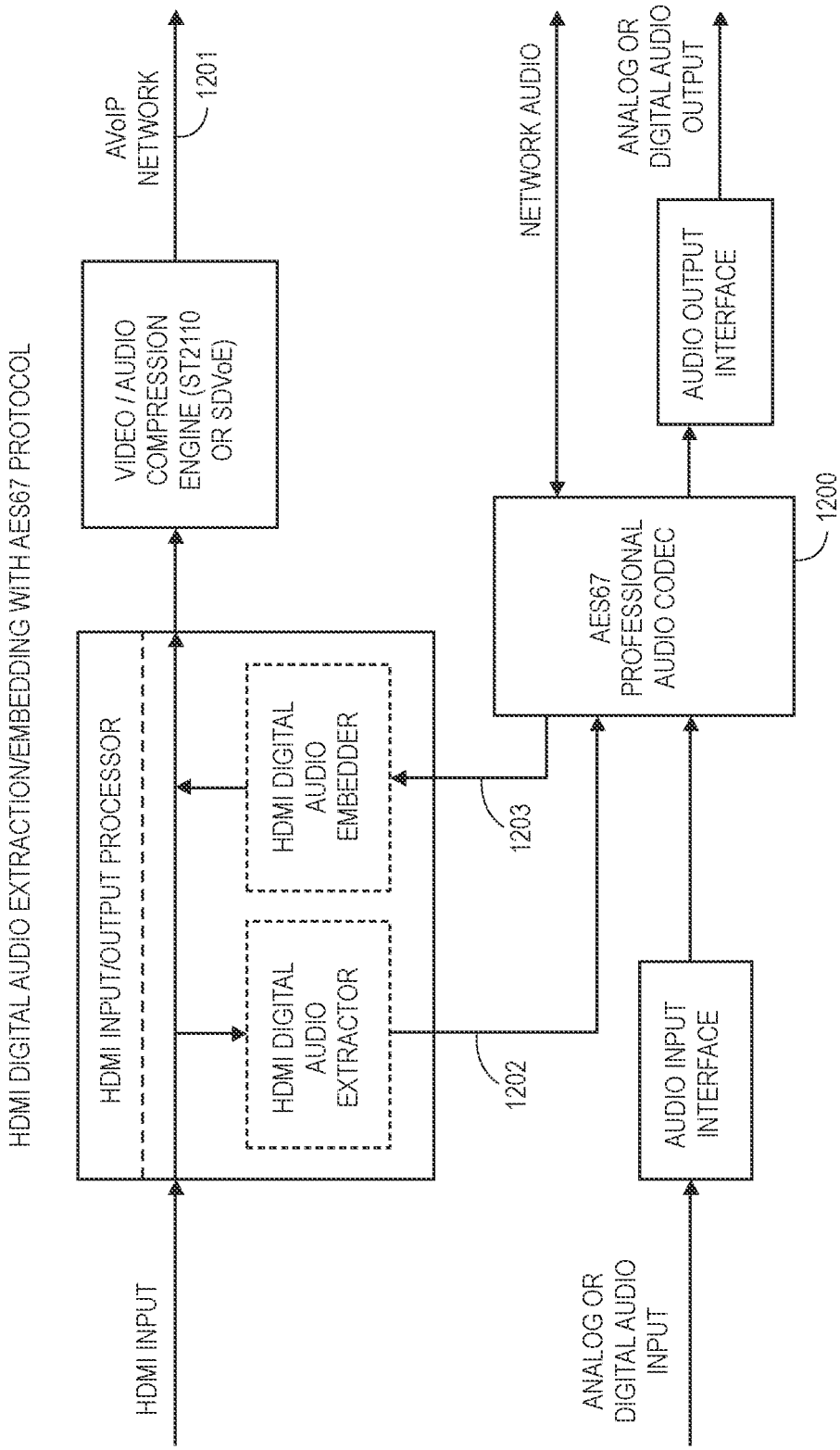
FIG. 12 illustrates a schematic view of an HDMI digital audio extraction/embedding with AES67 protocol that may be part of (or in communication with) the communication system, according to an embodiment.

FIG. 12 illustrates a schematic view of an HDMI digital audio extraction/embedding with AES67 protocol, according to an embodiment. The communication system 200 may integrate HDMI digital audio extraction and embedding with professional AES67 protocol in an AVoIP application. AES67 is a standard for transmission of audio over IP or Ethernet. This standard was developed by the Audio Engineering Society and is a layer-3 protocol to allow interoperability with various IP based professional networked audio such as RAVENA, Livewire, Q-LAN, and Dante. Some components in the communication system 200 may include an AES67 encoder/decoder 1200. This allows a mix of supported AVoIP data (e.g., SDVoE or ST2110) and AES67 to reside within the same AVoIP network 1201.

The communication system 200 can extract digital audio 1202 from HDMI sources to drive the AES67 encoder input. Using this AES67 transport medium, any HDMI source digital audio can be distributed to any AES67 decoder. Conversely, the AES67 decoder can re-embed the digital audio 1203 back to any HDMI output to be heard on televisions, audio/video receivers, or amplifiers. This feature allows the communication system 200 to interoperate with other standard third-party AES67 devices. Not only can the communication system 200 be used as an audio source and/or audio destination for AES67, the professional audio industry can now take advantage of other features such as audio/video matrixing and integrated audio digital signal processing.

Automatic Transcoding of AVoIP to Allow Mixed Matrixing of Disparate Protocols

Figure 13:
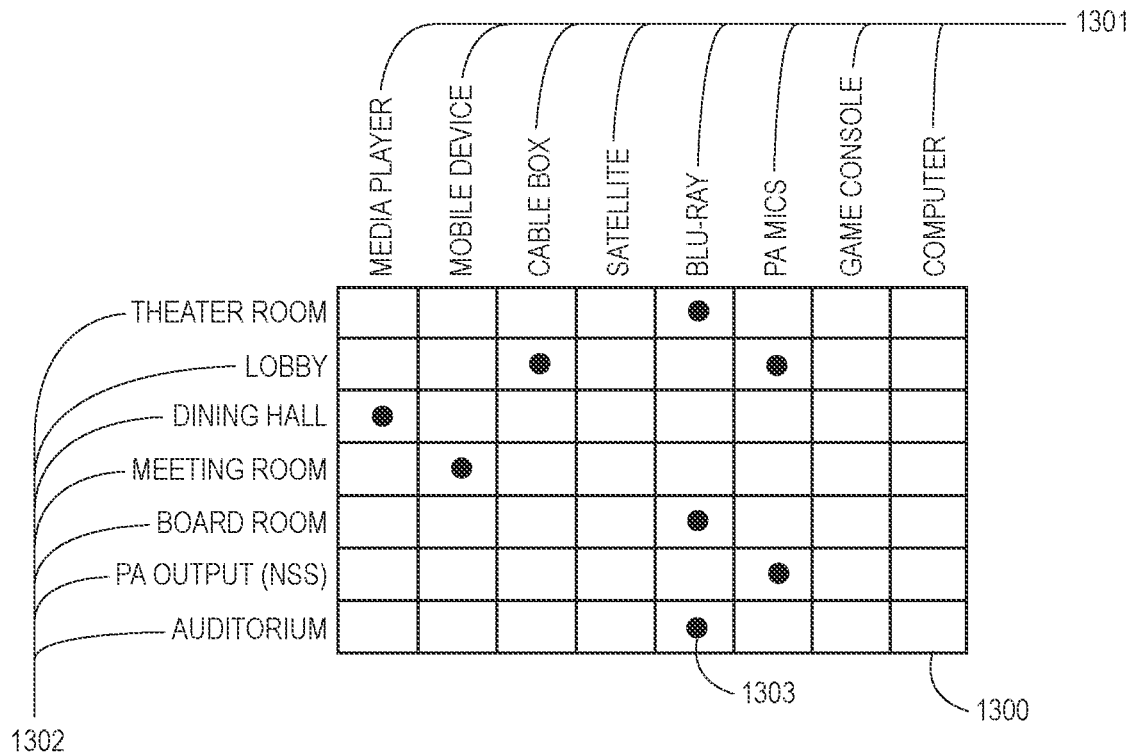
FIG. 13 illustrates a schematic view of graphical user interface (GUI) mixed matrixing with multiple AVoIP protocols that may be part of (or in communication with) the communication system, according to an embodiment.

FIG. 13 illustrates a schematic view of graphical user interface mixed matrixing with multiple AVoIP protocols, according to an embodiment. The communication system 200 may perform automatic transcoding of disparate AVoIP protocols to allow mixed matrixing of network packet AV data in a GUI. With automatic transcoding, the user need not know the disparate AVoIP protocols implemented in the installation. When matrix connections are made, the communication system 200 may use available transcoding techniques to allow disparate protocols to be linked to each other.

Devices in the communication system 200 may feature multiple AVoIP protocols (e.g., SDVoE and AES67) 300, 400. A matrix connection allows one encoder to connect to one or more decoders (e.g., one-to-one, or one-to-many connections). The matrix GUI 1300 is an example of a matrix graphical user interface where source outputs are arranged in columns 1301 while inputs are arranged in rows 1302. A selection on an intersection 1303 may connect an output to an input or multiple inputs. In the matrix example, the Blu-ray player is connected to one or more areas (e.g., the theater room, board doom, and auditorium).

An SDVoE video endpoint can connect to another SDVoE video endpoint. An h.265 video endpoint can connect to another h.265 video endpoint. However, the communication system 200 can transcode to connect disparate video protocols such as SDVoE to h.265 or h.265 to SDVoE. In addition, a SDVoE audio endpoint can connect to another SDVoE audio endpoint. An AES67 audio endpoint can connect to another AES67 endpoint. However, the communication system 200 can transcode to connect disparate protocols such as SDVoE to AES67 or AES67 to SDVoE.

The transcoding functionality of video and/or audio may be automatic, and the user need not know how one networked AV IP data is connected to disparate networked AV IP data. The user merely sees the matrix graphical user interface 1300 to allow connections between different standards of networked AV IP data. In the example of the mixed matrixing GUI, the mobile device video may be transported using h.265 compression and is connected to an SDVoE endpoint in the meeting room. In addition, the PA Mics AES67 codec may be connected to PA output AES67 Codec and the lobby SDVoE Codec. The transcoding connections may be done automatically to allow a connection matrix implementation with dissimilar network transport protocols of video and audio.

User Interface Swipe to AVoIP Cloud for Mobile Devices

The user interface may implement a swiping action from a mobile device application to enable mobile device screen mirroring out to the AVoIP cloud network. The application may be downloaded to the mobile device. The mobile device application may contain sufficient controls and graphics to enable full integration with the communication system 200. Once the matrix connections are configured, the mobile device application may allow a swiping action to enable screen mirroring of the mobile device display to output to any connected AVoIP endpoint in the communication system 200. A disable button may be available to turn off screen mirroring.

AES67 Matrixing with DSP Functionality for Professional Audio

Figure 14:
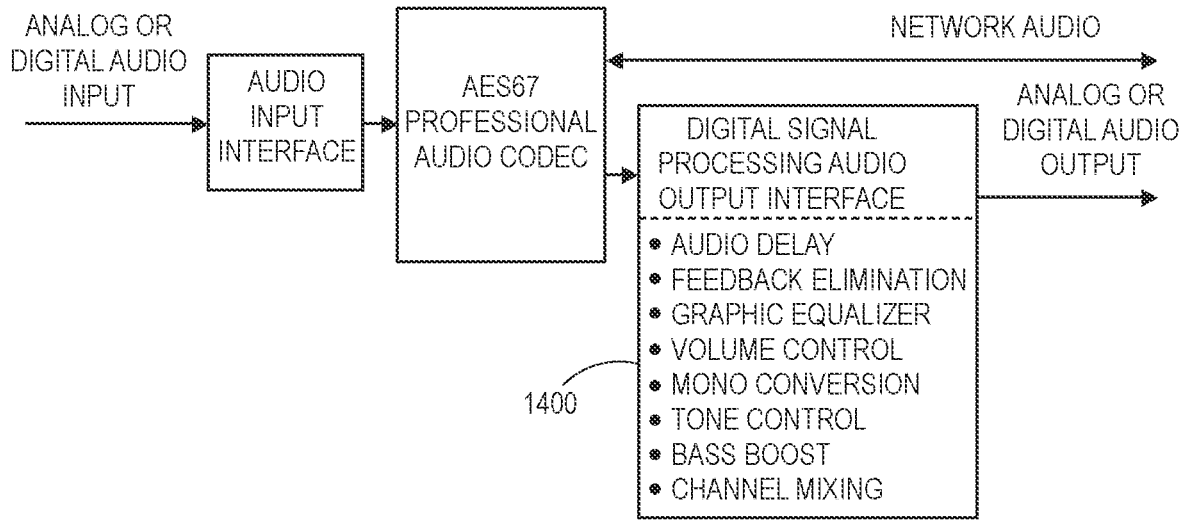
FIG. 14 illustrates a schematic view of audio digital signal processing (DSP) in the AVoIP system, according to an embodiment.

FIG. 14 illustrates a schematic view of audio digital signal processing in the AVoIP system, according to an embodiment. Audio digital signal processing may be featured in one or more devices of the communication system 200 to add advanced sound manipulation in a professional AES67 endpoint. With the advent of AES67 support, the communication system 200 can participate with third-party AES67 devices in the professional audio industry. In addition to the AES67 audio matrixing, the communication system 200 may include digital signal processing (DSP) 1400. The DSP allows audio to be processed with features such as, but not limited to, volume attenuation, graphic equalizer, tone control, spatial surround enhancement, bass boost, channel mixing, stereo to mono conversion, echo cancellation, and feedback elimination. These DSP functions may allow the communication system 200 to address the needs of numerous industries not currently served by other competing AVoIP systems.

In some AVoIP applications, the video and audio may be transported in different IP networked mediums depending on the demands of the installation. Some installations may use extensive audio processing, such as PA systems in large venues including airports, stadiums, and conventions. Some installations may use additional video processing such as videowalls, video mixing, picture-in-picture, and multi-view. The different audio and video paths may introduce lip-syncing issues where the audio heard does not match the video being viewed. Adjustable audio delay is introduced in devices of the communication system 200 to compensate for lip-sync issues.

Control Server

The control server 205 (FIG. 2) may be or include the central processor to control and monitor the endpoint devices (e.g., 201, 202, 203, and/or 204). The control server 205 may be the main user interface and features a built-in web GUI server which can be accessed on any computer or mobile device web browser. A matrix GUI may display the discovered devices, providing the interface to select media content from any encoder and displaying the media to a single decoder or multiple decoders. The control server 205 may also serve as a command conduit to allow third-party control systems (e.g., the CMU 210 on the vehicle 100) to interface with devices of the communication system 200. The parameters used to control the devices may pass through the control server 205.

Figure 15:
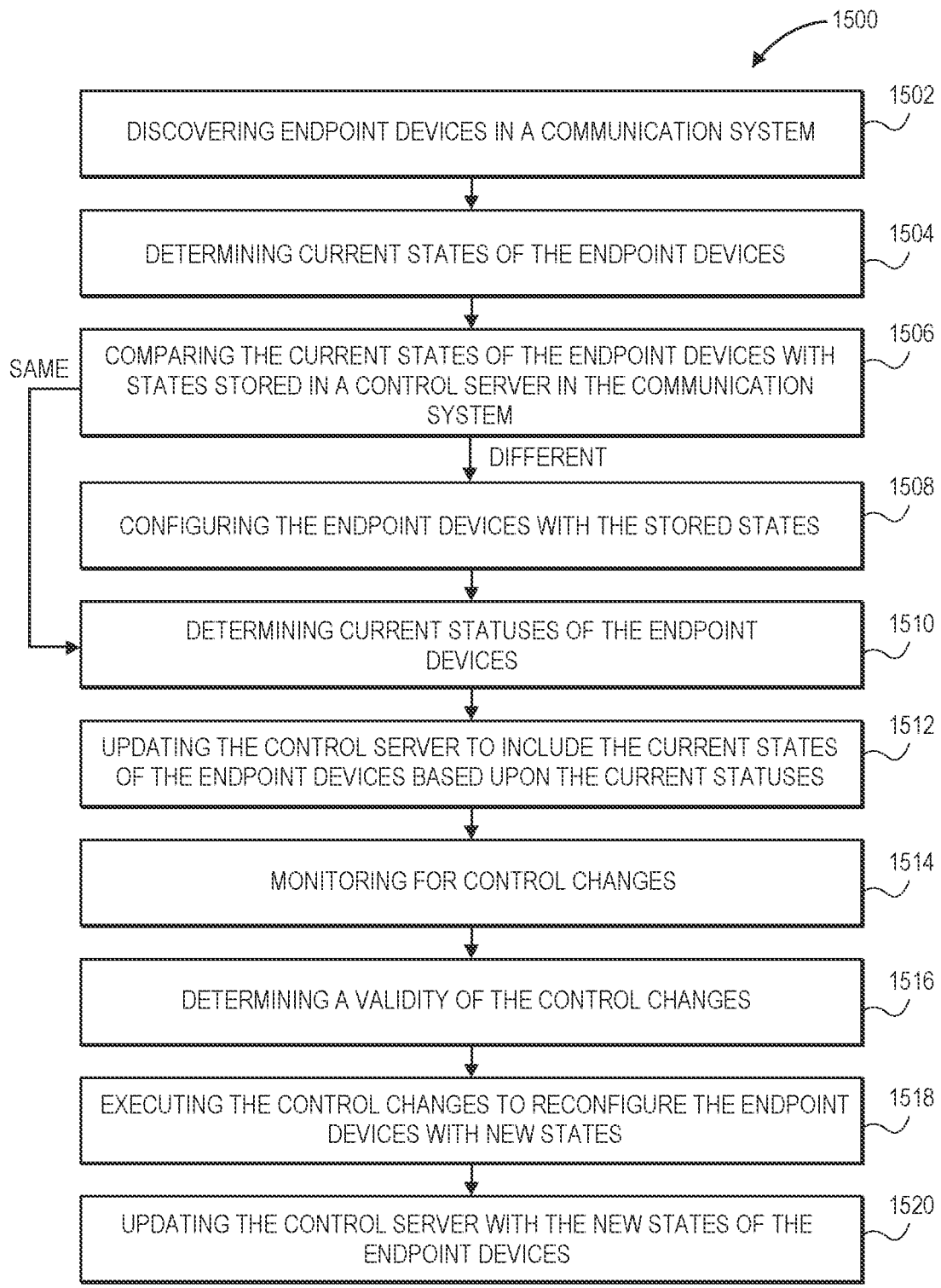
FIG. 15 illustrates a flowchart of a method for controlling and monitoring one or more endpoint devices (e.g., using the communication system), according to an embodiment.

FIG. 15 illustrates a flowchart of a method 1500 for monitoring and/or controlling one or more endpoint devices (e.g., encoders 201, decoders 202, codecs 203, speaker systems 204, or a combination thereof), according to an embodiment. One or more steps of the method 1500 may be performed by the communication system 200 (e.g., the control server 205).

In some embodiments, the method 1500 may incorporate asynchronous and/or synchronous endpoint device updates. A step is asynchronous when only one endpoint device is updated at any given time. A step is synchronous when multiple or all endpoint devices are updated simultaneously.

An illustrative order of the method 1500 is provided below; however, one or more steps of the method 1500 may be performed in a different order, combined into a single step, split into two sub-steps, repeated, or omitted without departing from the scope of the disclosure. The method 1500 may begin when the control server 205 is switched into an "on" state.

The method 1500 may include discovering the endpoint devices 201-204, as at 1502. More particularly, the control server 205 initiate communication with the endpoint devices 201-204 by transmitting discovery signals to the endpoint devices 201-204. The endpoint devices may be or include the encoders 201, the decoders 202, the codecs 203, the speaker systems 204, or a combination thereof. The control server 205 may then receive discovery response signals from the endpoint devices 201-204. The discovery response signals may identify the endpoint devices 201-204 that are online and/or ready for operation.

The method 1500 may also include determining current (e.g., first) states of the endpoint devices 201-204, as at 1504. More particularly, the control server 205 may transmit first state signals to the endpoint devices 201-204 that request the current state of each endpoint device 201-204. The control server 205 may then receive first state response signals from the endpoint devices 201-204. The first state response signals may identify the current state of each endpoint device 201-204. In at least one embodiment, steps 1502 and 1504 may be combined such that the discovery response signals include the current states of the endpoint devices 201-204.

As used herein, the "state" of an endpoint device and/or system is at a point in time when the device/system meets a pre-defined set of criteria, specifically, the current condition of the system (e.g., encoder #1 is connected to decoder #2). Examples of encoder and decoder "states" may include, but are not limited to: device name, firmware/hardware version, serial number, MAC address list, IP address list, device temperature, AVoIP connection state, AVoIP stream address, AVoIP stream state, negotiation state with media source device, negotiation state with display device, video format [e.g., resolution, dynamic range, frame rate, color space, bit depth, scan mode, video stable, HDCP content protection version, pixel clock, colorimetry, aspect ratio], audio format [e.g., sampling rate, number of channels, encoding type], EDID specifications [e.g., monitor name, native horizontal pixels, native vertical pixels, native frame rate, interlace/progressive, dynamic range, maximum pixel clock, color space support, bit depth support], AEM configuration, network bridge state, audio down-mixer state, serial communication state, and USB connection state.

The method 1500 may also include comparing the current states of the endpoint devices 201-204 (from step 1504) with stored states of the endpoint devices 201-204 in an internal device table, as at 1506. More particularly, the control server 205 may include the internal device table, which may have stored states for each of the endpoint devices 201-204. The control server 205 may compare the received (e.g., current) states with the corresponding stored states in the internal device table (e.g., to determine whether they are the same or different).

Any new endpoint devices 201-204 that are added to the communication system 200 may also be added as a new endpoint device 201-204 in the internal device table. Offline endpoint devices 201-204 may be identified if these endpoint devices 201-204 are in the internal device table but have not checked in with control server 205. In an example, these offline devices 201-204 may show up as "grayed out" icons in the matrix GUI and may not be controllable until these endpoint devices 201-204 are turned on and properly checked in with the control server 205.

If the current states of the endpoint devices 201-204 are different from the stored states in the internal device table, then the method 1500 may include configuring the endpoint devices 201-204 with the stored states, as at 1508. More particularly, the control server 205 may transmit configuring signals to the endpoint devices 201-204 whose current states differ from their stored states, which actuate those endpoint devices 201-204 into the stored state. The control server 205 may then receive a configuring response signal from those endpoint devices 201-204 indicating that they have actuated into the stored state. If the current states of the endpoint devices 201-204 are the same as the stored states in the internal device table, then step 1508 may be omitted, and the method 1500 may proceed to step 2110 below. If this is a first-time installation setup, the internal device table may be empty. The user may configure the endpoint devices 201-204 based on the requirements of the installation, and this step may occur in below (e.g., at 2114).

The method 1500 may also include determining current statuses of the endpoint devices 201-204, as at 2110. More particularly, the control server 205 may transmit status signals to the endpoint devices 201-204 that query the current statuses of each endpoint device 201-204. The control server 205 may then receive status response signals from the endpoint devices 201-204 that include the current statuses.

As used herein, the "status" of an endpoint device and/or system describes the transition into a state and/or the outcome of an action at a particular point in time (e.g., decoder #3 was disconnected from a television and its status is "waiting for new Hot Plug Connection." On the contrary, the state of same decoder #3 may be "No Display Connected"). Examples of encoder and decoder "statuses" may include, but are not limited to: device ready, built-in-self test result, AVoIP stream status, encoder source change status, encoder AV stable, hot-plug detect with display device, decoder EDID change status, HDCP content protection status, AEM configuration status, AVoIP connection status, serial communication status, USB connection status, etc. In an embodiment, the status may be or include negotiation confirmation with media sources, current video and audio formats from media sources, content protection negotiation with display devices, encoder streaming status, decoder stream receiving status, built-in self-test results, device over-temperature warning, other hardware related health information, or a combination thereof.

The method 1500 may also include updating the internal device table of the control server 205 to include the current states of the endpoint devices 201-204, as at 2112. The internal device table may be updated based at least partially upon the queried statuses from step 2110. In other words, the internal device table may be updated based on both the new states of the endpoint devices 201-204 as a result of the status changes that occur in step 2110. The GUI may also be updated. As an example, step 2110 may yield an "AVoIP connection status" from a decoder 202 resulting in a "no display detected error." The internal device table and/or GUI may then be updated to reflect this in step 2112, and then the state of the decoder's internal device table may be updated to indicate "no display connected and no valid EDID specification".

The GUI may inform the user of the statuses of selected endpoint devices 201-204, such as device ready, AVoIP stream status, and HDCP content protection status. The GUI may also inform the user of the states of selected endpoint devices 201-204, such as the video formats of the encoded streams, and video formats of the decoded streams. The matrix grid may be updated to inform the user of which encoder 201 is streaming to one or more decoders 202.

The method 1500 may also include monitoring for control changes, as at 2114. The control changes may be one or more commands from a user that is/are received by the control server 205. If the internal device table is empty, and this is a first-time installation, the installer may configure the endpoint devices 201-204 based on the requirements of the system deployment. Network requirements may dictate the configuration of each device endpoint's 10G to 1G network bridge 307, 407. On certain endpoint devices 201-204 with WiFi SOM modules, mobile device media integration may use valid WiFi endpoint hostnames to allow user mobile devices to discover available wireless media connections. On certain endpoint devices 201-204 with AES67 codecs, the precision time protocol (PTP) grandmaster may be assigned. On certain endpoint devices 201-204 with SDVoE codecs, modes such as fast switch, fast switch scaling, genlock, genlock scaling, multi-view, video wall, or a combination thereof may be configured. After the first-time installation configuration is complete, the internal device table may be updated, as described in step 2120 below.

If the control changes from step 2114 are from an end-user (e.g., GUI, or third-party control system), then operational changes may be performed such as, but not limited to: video/audio encoder to decoder connections, multi-view source connections, video wall source connections, mobile media source connections, and audio digital signal processing functions. Audio DSP functions may include, but are not limited to, volume, delay, graphic equalizer, tone control, spatial enhancement, and bass enhancement.

The method 1500 may also include determining the validity of the control changes, as at 2116. The validity of the command (e.g., including the control changes) may be determined by the control server 205 based at least partially upon device features, installation configuration(s), or both of the endpoint devices 201-204. The validation step checks to ensure user control changes apply to the given endpoint device installation. Control changes may be stored on the internal device table as described below, while non applicable control changes may be discarded by the control server 205.

The method 1500 may also include executing the control changes to reconfigure the endpoint devices 201-204 with new (e.g., second) states, as at 2118. In other words, if the control changes are determined to be valid, the control server 205 may execute audio and/or video media connections from one or more endpoint devices (e.g., encoders) 201 to one or more other endpoint devices (e.g., decoders) 202. This may include transmitting second state signals (also referred to as command state signals) to the endpoint devices 201-204 with new control parameters to change the states of the endpoint devices 201-204. The control parameters in the second state signals may entail control changes from user inputs, installer inputs, and/or inputs from third-party control systems. Depending on valid control changes, the step 2118 may invoke the command state signals to the autonomous EDID management processor so that hardware encoder and decoder configuration changes maintain AEM compatibility or native performance modes.

The control server 205 may then receive second state response signals from the endpoint devices 201-204 to acknowledge and echo-back the new states transmitted by the control server 205. This may be done to confirm that the second state signals transmitted by the control server 205 have been properly received by the endpoint devices 201-204. If the second state response signals do not agree with the second state signals, the control server 205 may retry sending the second state signals to the affected endpoint device 201-204. Repeated echo back validation failures from an endpoint device 201-204 may prompt a failure flag to be stored in the internal device table. The failure flag may be cleared after a successful validation. The failure flag can be viewed by the user/installer to determine which endpoint device 201-204 may be in need of service.

The speaker system 204 and/or displays 207 may output audio and/or video in response to the endpoint devices 201-204 switching into the new states (e.g., in response to the second state signals). In other embodiments, the speaker system 204 and/or displays 207 may also or instead output audio and/or video in response to the current states (at step 1504), the stored states (at step 1508), the current statuses (at step 2110), or a combination thereof.

The method 1500 may also include updating the internal device table with the new states of the endpoint devices 201-204, as at 2120. More particularly, the control server 205 may update the internal device table with the latest successful state changes and may be deemed to be in a new known good state.

In one embodiment, the method 1500 may loop back around to step 2110 and repeat. The iterative process may provide constant feedback between user inputs and the current state of the endpoint devices 201-204. Validation of the user inputs followed by a handshake negotiation (also referred to as an echo back) with the endpoint devices 201-204 may ensure that the overall system is in a known good state. When the communication system 200 is restarted, the communication system 200 may continue from the last known good state unless a factory default is initiated.

The systems 200 and methods 1500 described herein have not previously been incorporated in any existing AVoIP system. The system's configurable AVoIP network ports may provide network deployment flexibility and allow end-customers and installers to dictate the network infrastructure based on system performance, security, and cost. The communication system 200 may incorporate multiple audio and video compression standards including professional AES67 audio coding and high-compression AV (e.g., h.265) to bridge mobile devices with high-end AVoIP networks. The introduction of system on modules with WiFi connectivity means mobile devices can perform screen mirroring to connect smartphones and tablets to any display in the AVoIP network. The communication system 200 may perform automatic transcoding so that disparate AV protocols can be connected to other dissimilar AV protocols.

Autonomous EDID management may allow the system to automatically configure video sources and display endpoints to maximize compatibility, maximize video performance, and/or allow user intervention with options determined by the AEM processor. The Autonomous EDID management can also automatically configure audio sources and amplifier/sound processor endpoints to maximize compatibility, maximize audio surround performance, or allow user intervention with options determined by the AEM processor.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. An audio video over internet protocol (AVoIP) communication system for communicating within an aircraft, the AVoIP communication system comprising:
   one or more sources, wherein the one or more sources comprise one or more audio sources and one or more video sources;
   one or more speakers configured to output audio from the one or more audio sources;
   one or more displays configured to output video from the one or more video sources;
   a plurality of endpoint devices, wherein the endpoint devices comprise:
      one or more encoders configured to be in communication with the one or more sources and a network switch; and
      one or more decoders configured to be in communication with the one or more displays and the network switch; and
   a control server configured to be in communication with the one or more speakers and the endpoint devices via the network switch, wherein the control server is configured to perform operations, the operations comprising:
      transmitting discovery signals to the endpoint devices;
      receiving discovery response signals from the endpoint devices in response to the discovery signals, wherein the discovery response signals indicate that the endpoint devices are online, ready for operation, or both;
      transmitting first state signals to the endpoint devices;
      receiving first state response signals from the endpoint devices in response to the first state signals, wherein the first state response signals identify states of the endpoint devices, and wherein the states of the endpoint devices comprise a first state of a first of the endpoint devices;
      comparing the states of the endpoint devices with stored states, wherein the stored states are stored in an internal device table in the control server;
      determining that the first state of the first endpoint device differs from a first stored state in the internal device table based upon the comparison;
      transmitting a configuring signal to the first endpoint device that actuates the first endpoint device into the first stored state;
      receiving a configuring response signal from the first endpoint device that indicates that the first endpoint devices has actuated into the first stored state;
      transmitting status signals to the endpoint devices;
      receiving status response signals from the endpoint devices in response to the status signals, wherein the status response signals indicate statuses of the endpoint devices;
      updating the internal device table to include the states of the endpoint devices, including the first stored state of the first endpoint device, based at least partially upon the statuses of the endpoint devices;
      receiving one or more control changes;
      validating the one or more control changes;
      transmitting second state signals to the endpoint devices after validating the one or more control changes;
      receiving second state response signals from the endpoint devices that echo the second state signals, indicating that the endpoint devices have actuated into new states, wherein the one or more speakers output the audio, the one or more displays output the video, or both at least partially in response to the endpoint devices actuating into the new states; and
      updating the internal device table to include the new states for the endpoint devices.

2. The AVoIP communication system of claim 1, wherein each of the endpoint devices utilize multiple AVoIP network ports through use of configurable packet-based multiplexing and network bridging to provide flexibility.

3. The AVoIP communication system of claim 1, wherein the one or more encoders, the one or more decoders, or both comprise:
   a network bridge; and
   a multiplexer that is configured to integrate first and second data packets from the one or more audio sources, the one or more video sources, or both over a first network interface using the network bridge, wherein the first data packets have a lower bandwidth than the second data packets.

4. The AVoIP communication system of claim 3, wherein the multiplexer is configured to bridge the first network interface and a second network interface, wherein the first network interface is faster than the second network interface.

5. The AVoIP communication system of claim 1, wherein a single network cable is used for each encoder and corresponding decoder.

6. The AVoIP communication system of claim 1, wherein the one or more sources comprise a mobile device, and wherein the one or more encoders comprise an integrated decoder that allows the audio, the video, or both from the mobile device to be distributed to the one or more speakers, the one or more displays, or a combination thereof.

7. The AVoIP communication system of claim 1, wherein the one or more displays comprise a mobile device, and wherein the one or more decoders comprise an integrated encoder that allows the audio, the video, or both from the one or more sources to be distributed to the mobile device.

8. The AVoIP communication system of claim 1, wherein the one or more speakers comprise a self-powered speaker system that includes network cabling, built-in AVoIP decoders, built-in audio amplification, and power-over-ethernet (POE).

9. The AVoIP communication system of claim 1, wherein the control server is configured to perform autonomous extended display information data (EDID) management to allow an automatic compatibility mode, a native mode, user intervention, or a combination thereof to control video endpoints between the one or more sources and the one or more displays.

10. The AVoIP communication system of claim 1, wherein the control server is configured to perform autonomous extended display information data (EDID) management to allow an automatic compatibility mode, a native mode, user intervention, or a combination thereof to control audio endpoints between the one or more sources and the one or more speakers.

11. The AVoIP communication system of claim 1, wherein the one or more encoders and the one or more decoders comprise an audio engineering society 67 (AES67) codec including audio connection interfaces.

12. The AVoIP communication system of claim 1, wherein the one or more decoders are integrated into the one or more displays, and wherein the one or more displays comprise a television, a projector, a videowall, or a combination thereof.

13. A communication system for communicating within a vehicle, the communication system comprising:
   a plurality of endpoint devices, wherein the endpoint devices comprise:
      one or more encoders configured to be in communication with one or more sources and a network switch; and
      one or more decoders configured to be in communication with one or more displays and the network switch; and
   a control server configured to be in communication with the endpoint devices via the network switch, wherein the control server is configured to perform operations, the operations comprising:
      discovering the endpoint devices;
      determining states of the endpoint devices including determining that a first of the endpoint devices is in an initial state;
      comparing the initial state of the first endpoint device with a stored state for the first endpoint device;
      actuating the first endpoint device from initial state to the stored state in response to the initial state differing from the stored state;
      determining statuses of the endpoint devices;
      updating the control server to include the states of the endpoint devices, including the stored state of the first endpoint device, based at least partially upon the statuses of the endpoint devices;
      receiving one or more control changes;
      actuating the first endpoint device from the stored state into a new state in response to the one or more control changes; and
      receiving an echo signal from the first endpoint device that indicates that the first endpoint device has actuated into the new state.

14. The communication system of claim 13, wherein the one or more displays output audio, video, or both at least partially in response to the first endpoint device actuating into the new state.

15. The communication system of claim 13, wherein actuating the first endpoint device into the new state comprises executing a media connection between a first of the one or more encoders and a first of the one or more decoders.

16. The communication system of claim 13, wherein each of the endpoint devices utilize multiple AVoIP network ports through use of configurable packet-based multiplexing and network bridging to provide flexibility.

17. The communication system of claim 13, wherein the one or more encoders, the one or more decoders, or both comprise:
   a network bridge; and
   a multiplexer that is configured to integrate first and second data packets from one or more audio sources, one or more video sources, or both over a first network interface using the network bridge, wherein the first data packets have a lower bandwidth than the second data packets.

18. The communication system of claim 17, wherein the multiplexer is configured to bridge the first network interface and a second network interface, wherein the first network interface is faster than the second network interface.

19. The communication system of claim 13, wherein a single network cable is used for each encoder and corresponding decoder.

20. The communication system of claim 13, wherein the one or more sources comprise a mobile device, and wherein the one or more encoders comprise an integrated decoder that allows audio, video, or both from the mobile device to be distributed to one or more speakers, one or more displays, or a combination thereof.

21. The communication system of claim 13, further comprising a mobile device, wherein the one or more decoders comprise an integrated encoder that allows audio, video, or both from the one or more sources to be distributed to the mobile device.

22. The communication system of claim 13, wherein the control server is configured to perform autonomous extended display information data (EDID) management to allow an automatic compatibility mode, a native mode, user intervention, or a combination thereof to control video endpoints between the one or more sources and one or more displays.

23. The communication system of claim 13, wherein the control server is configured to perform autonomous extended display information data (EDID) management to allow an automatic compatibility mode, a native mode, user intervention, or a combination thereof to control audio endpoints between the one or more sources and one or more speakers.

24. A method, comprising:
   discovering a plurality of endpoint devices, wherein the endpoint devices comprise an encoder and a decoder;
   determining states of the endpoint devices including determining that a first of the endpoint devices is in an initial state;
   comparing the initial state of the first endpoint device with a stored state for the first endpoint device;
   actuating the first endpoint device from initial state to the stored state in response to the initial state differing from the stored state;
   determining statuses of the endpoint devices;
   updating the control server to include the states of the endpoint devices, including the stored state of the first endpoint device, based at least partially upon the statuses of the endpoint devices;
   receiving a control change; and
   actuating the first endpoint device from the stored state into a new state based at least partially upon the control change.

25. The method of claim 24, wherein the encoder is configured to be in communication with a source and a network switch, and wherein the decoder is configured to be in communication with a display and the network switch, and wherein the display outputs audio, video, or both at least partially in response to the first endpoint device actuating into the new state.

26. The method of claim 24, wherein determining the states of the endpoint devices comprises determining that the encoder is connected to the decoder.

27. The method of claim 24, wherein, in response to the decoder being disconnected from a display:
   determining the states of the endpoint devices comprises determining that the decoder has no display connected thereto; and
   determining the statuses of the endpoint devices comprises determining that the decoder is waiting for a new connection.

28. The method of claim 24, wherein determining the statuses of the endpoint devices yields an audio video over internet protocol (AVoIP) connection status from the decoder, resulting in an error signal indicating that no display is detected, which is reflected in a graphical user interface (GUI).

\* \* \* \* \*

UNITED STATES PATENT AND TRADEMARK OFFICE
CERTIFICATE OF CORRECTION

PATENT NO. : 11,265,358 B1
APPLICATION NO. : 17/354097
DATED : March 1, 2022
INVENTOR(S) : Edvard Dellalyan et al.

Page 1 of 1

It is certified that error appears in the above-identified patent and that said Letters Patent is hereby corrected as shown below:

In the Claims

In Claim 24:
At Column 24, Line 42 "updating the control server" should be --updating a control server--

Signed and Sealed this
Nineteenth Day of August, 2025

Coke Morgan Stewart
*Acting Director of the United States Patent and Trademark Office*